US011960864B2

(12) United States Patent
Kaliyaperumal et al.

(10) Patent No.: US 11,960,864 B2
(45) Date of Patent: Apr. 16, 2024

(54) CREATING APPLICATIONS AND TEMPLATES BASED ON DIFFERENT TYPES OF INPUT CONTENT

(71) Applicant: Microsoft Technology Licensing, LLC, Redmond, WA (US)

(72) Inventors: PalaniRaj Kaliyaperumal, Redmond, WA (US); Lily Xinchen Liu, Redmond, WA (US); Kuralmani Elango, Bothell, WA (US); Kunal Mukerjee, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 17/485,973

(22) Filed: Sep. 27, 2021

(65) Prior Publication Data

US 2023/0095089 A1    Mar. 30, 2023

(51) Int. Cl.
*G06F 8/38* (2018.01)
*G06F 40/186* (2020.01)
*G06F 40/279* (2020.01)
*G06V 30/414* (2022.01)

(52) U.S. Cl.
CPC .............. *G06F 8/38* (2013.01); *G06F 40/186* (2020.01); *G06F 40/279* (2020.01); *G06V 30/414* (2022.01)

(58) Field of Classification Search
CPC ........ G06F 8/38; G06F 40/186; G06F 40/279; G06V 30/414; G06V 10/235; G06V 10/25; G06V 10/945; G06V 30/19147; G06V 30/19173; G06V 30/413

USPC ......................................................... 715/762
See application file for complete search history.

(56) References Cited

U.S. PATENT DOCUMENTS

| | | | |
|---|---|---|---|
| 8,006,192 B1* | 8/2011 | Reid ...................... | G06F 3/0481 715/762 |
| 9,176,742 B2* | 11/2015 | Kohli ........................ | G06F 8/76 |
| 10,489,126 B2* | 11/2019 | Kumar ...................... | G06T 7/70 |
| 11,023,720 B1* | 6/2021 | Desai ................... | G06N 3/0454 |
| 11,221,833 B1* | 1/2022 | Huang ...................... | G06T 7/90 |
| 11,232,561 B2* | 1/2022 | Prabhudesai ............. | G06T 7/11 |

(Continued)

OTHER PUBLICATIONS

Matthew Zeiler and Rob Fergus; Visualizing and Understanding Convolutional Networks; Nov. 28, 2013; arXiv; pp. 1-11.*

(Continued)

*Primary Examiner* — Andrew R Dyer
(74) *Attorney, Agent, or Firm* — Foley IP Law, PLLC

(57) ABSTRACT

The disclosure herein describes generating an application from input content. Input content of a content type is obtained, such as an image file, digital document file, or the like. A content data extractor is selected from a set of content data extractors based on the content type. A set of content entities is extracted from the obtained input content using the selected content data extractor, such as text labels, text boxes, buttons, or the like. The set of content entities are normalized according to a standard interface schema and an application template is generated using the normalized set of content entities, whereby an application can be developed using the generated application template. The disclosure enables application interfaces to be designed using a variety of methods and for those different types of designs to be efficiently converted to a functional application.

17 Claims, 18 Drawing Sheets

(56) References Cited

U.S. PATENT DOCUMENTS

| | | | | |
|---|---|---|---|---|
| 2007/0130529 | A1* | 6/2007 | Shrubsole | G06F 9/451 |
| | | | | 715/762 |
| 2008/0117448 | A1* | 5/2008 | Ijams | G06F 40/186 |
| | | | | 358/1.15 |
| 2010/0088239 | A1* | 4/2010 | Blair | G06Q 50/188 |
| | | | | 705/26.1 |
| 2010/0313182 | A1* | 12/2010 | Chen | G06F 8/38 |
| | | | | 717/109 |
| 2011/0010645 | A1* | 1/2011 | Mihalcea | G06F 8/38 |
| | | | | 715/762 |
| 2011/0246535 | A1* | 10/2011 | Freeman | G06F 16/256 |
| | | | | 707/E17.044 |
| 2012/0084685 | A1* | 4/2012 | Heynen | G06T 11/60 |
| | | | | 715/763 |
| 2012/0254730 | A1* | 10/2012 | Sunderland | G06F 40/186 |
| | | | | 715/234 |
| 2012/0311612 | A1* | 12/2012 | Rodriguez | G06F 9/451 |
| | | | | 719/328 |
| 2012/0317470 | A1* | 12/2012 | Dejean | G06V 30/414 |
| | | | | 715/227 |
| 2016/0179897 | A1* | 6/2016 | Zheng | G06F 16/289 |
| | | | | 707/722 |
| 2016/0275374 | A1* | 9/2016 | Zhu | G06K 9/6268 |
| 2017/0060857 | A1* | 3/2017 | Imbruce | G06T 13/205 |
| 2017/0315786 | A1* | 11/2017 | Rogers | G06F 8/35 |
| 2018/0157467 | A1* | 6/2018 | Stachura | G06F 8/34 |
| 2018/0203571 | A1 | 7/2018 | Dayanandan et al. | |
| 2018/0225125 | A1* | 8/2018 | Okamoto | G06V 10/40 |
| 2018/0349730 | A1 | 12/2018 | Dixon et al. | |
| 2019/0180150 | A1* | 6/2019 | Taylor | G06V 30/224 |
| 2019/0180443 | A1* | 6/2019 | Xue | G06V 10/44 |
| 2019/0250891 | A1* | 8/2019 | Kumar | G06K 9/6257 |
| 2019/0286620 | A1* | 9/2019 | Al-Haimi | G06F 16/211 |
| 2020/0193589 | A1* | 6/2020 | Peshlov | G06T 5/00 |
| 2020/0265153 | A1* | 8/2020 | Li | G06K 9/6262 |
| 2020/0315587 | A1* | 10/2020 | Toporek | A61B 8/5246 |
| 2021/0125004 | A1* | 4/2021 | Robert | G06V 10/82 |
| 2021/0289131 | A1* | 9/2021 | Yadav | G06V 20/52 |
| 2021/0311723 | A1* | 10/2021 | Vaindiner | G06F 8/65 |
| 2021/0342785 | A1* | 11/2021 | Mann | G06Q 10/06316 |
| 2021/0397420 | A1* | 12/2021 | Stachura | G06F 8/30 |
| 2022/0067365 | A1* | 3/2022 | Agrawal | G06F 40/30 |
| 2022/0147702 | A1* | 5/2022 | Li | G06N 3/045 |
| 2022/0207268 | A1* | 6/2022 | Gligan | G06F 16/93 |
| 2022/0318224 | A1* | 10/2022 | Thompson | G06V 30/413 |
| 2022/0319219 | A1* | 10/2022 | Tsibulevskiy | G06T 3/60 |

OTHER PUBLICATIONS

"Invison", Retrieved from: https://web.archive.org/web/20210817023230/https://www.invisionapp.com/, Aug. 17, 2021, 13 Pages.

"Uizard", Retrieved from: https://web.archive.org/web/20210811233640/https://uizard.io/, Aug. 11, 2021, 8 Pages.

"International Search Report and Written Opinion Issued in PCT Application No. PCT/US22/040675", dated Nov. 11, 2022, 13 Pages.

* cited by examiner

400A

Buy

1. Selection

☐ Go to question 2
☐ Go to question 3

2. First Name

[Enter your answer]

3. Last Name

[Enter your answer]

[+ Add new]

FIG. 4A

CREATING APPLICATIONS AND TEMPLATES BASED ON DIFFERENT TYPES OF INPUT CONTENT

BACKGROUND

In the world of application development, developers can either start from data or start from scratch. The first option is helpful for users who want to quickly get the basic components (e.g., a form, a gallery, buttons, etc.), but it can be difficult to customize the application and change the default layout. The second option is helpful for users who want precise control over the design of the application, but it is time-consuming and laborious to manually configure each component. It is challenging for developers to quickly obtain an application that has both the components they need and the designs they want. Furthermore, developers that are not familiar with code can feel overwhelmed and unsure about how to get started with developing an application.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for generating an application template from input content is described. Input content of a content type is obtained, such as an image file, digital document file, or the like. A content data extractor is selected from a set of content data extractors based on the content type. A set of content entities is extracted from the obtained input content using the selected content data extractor, such as text labels, text boxes, buttons, or the like. The set of content entities are normalized according to a standard interface schema and an application template is generated using the normalized set of content entities, whereby an application can be developed using the generated application template.

BRIEF DESCRIPTION OF THE DRAWINGS

The present description will be better understood from the following detailed description read in light of the accompanying drawings, wherein:

FIGS. 4A-H are diagrams illustrating a GUI enabling a user to generate an application from an image;

Corresponding reference characters indicate corresponding parts throughout the drawings. In FIGS. 1 to 8, the systems are illustrated as schematic drawings. The drawings may not be to scale.

DETAILED DESCRIPTION

Figure 1:
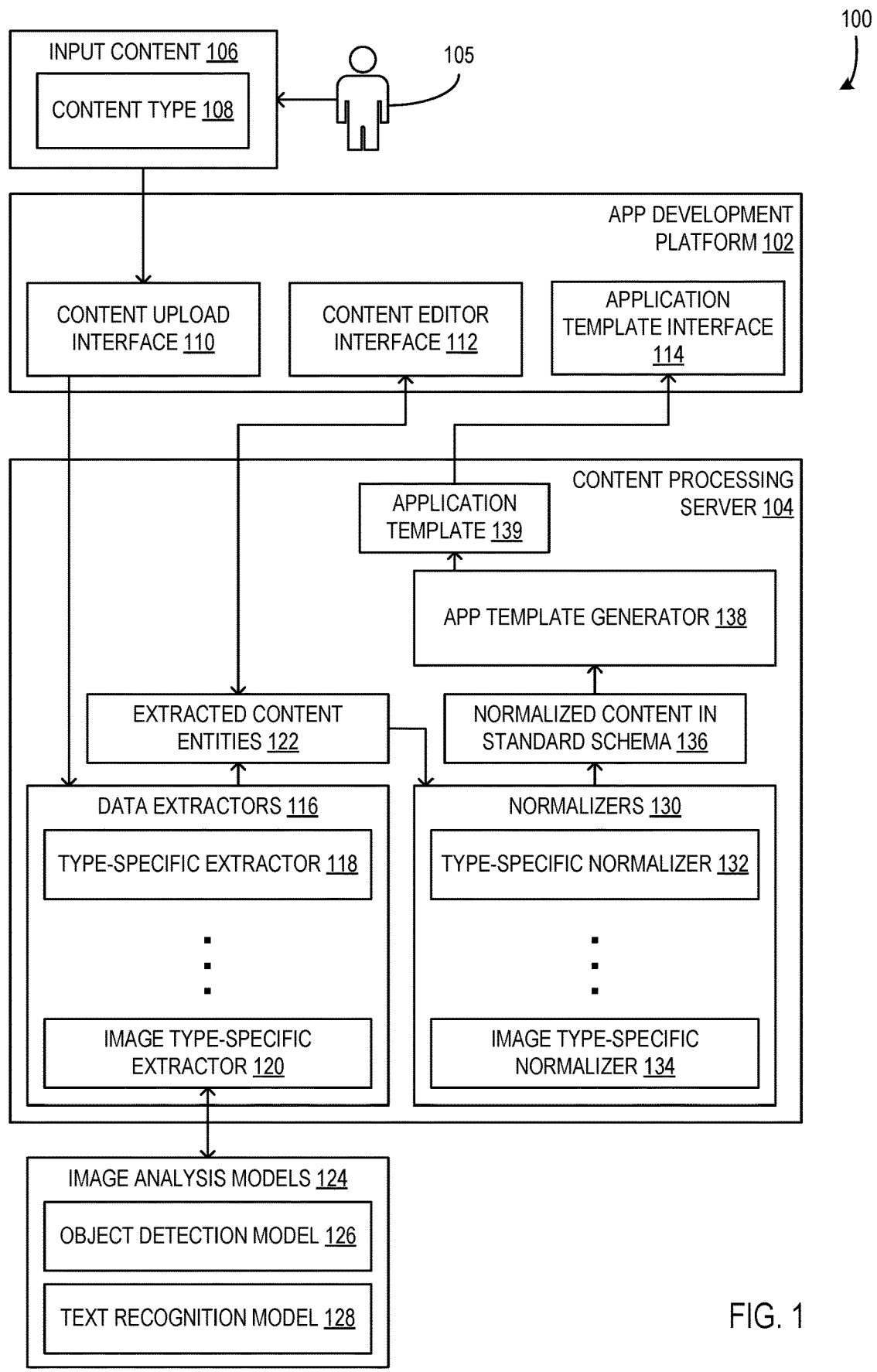
FIG. 1 is a block diagram illustrating a system configured to generate an application template from input content.

Aspects of the disclosure provide a computerized method and system for generating an application template from input content. A user is enabled to upload input content of various types (e.g., interface layouts that have been hand-drawn, created organically or non-digitally, scanned from a Portable Document Format (PDF) document, or created using various tools such as POWERPOINT™ or FIGMA™). A content data extractor is selected from a set of content data extractors based on the content type of the input file. A set of content entities is extracted from the obtained input content using the selected content data extractor, such as text labels, text boxes, buttons, or the like. For instance, when the input is an image file (e.g., a hand-drawn sketch, or other non-digitized graphic), object detection models and/or text recognition models are used to extract content entities from the image. The set of content entities are normalized according to a standard interface schema and an application template is generated using the normalized set of content entities, whereby an application can be developed using the generated application template. The application template is configured to include stub functions or basic functions for controlling the application and even linked data tables or other structures, in some examples.

The disclosure operates in an unconventional manner at least by enabling a wide variety of different types of input to be converted into application templates using type-specific content data extractors. The described "Create from Content" process transforms the way makers and developers build applications by allowing anyone to efficiently create an application from an existing design. Instead of starting with data and having to customize the layout and styles or starting from scratch and having to manually configure everything, makers can start with content they already have and quickly generate an application based on that content, even if it is just a quick hand-drawn sketch.

The present disclosure enables any user to upload their content and obtain a generated application template based on that content, without having to rely on a professional developer or a highly experienced maker to go through the manual steps to transform a visual design into an application. By leveraging existing content that the user provides, in whatever format the user provides that content, aspects of the disclosure accelerate the application creation process and enable users to build out their ideas faster and more efficiently, in a low-to-no code environment.

Advantages of the disclosure enable a user to use a quick whiteboard sketch, or a design created using a presentation design tool (e.g., POWERPOINT), as content input, and turn that content into an application template with little or no coding. In other aspects of the disclosure, a user can digitally transform PDF forms into mobile applications in just a few steps without writing a single line of code. Many organizations still have paper forms that are filled in by hand; then, manual data entry must be performed, which is cumbersome, time-consuming, and error prone. The present disclosure enables users to directly convert a paper form to an application template, which can be used to develop an application that enables more efficient collection of the associated form data.

In many examples, users trying to develop an application already have an existing design that they have created elsewhere, and they must manually convert the visual design into the application. This step is normally performed by a professional developer or an experienced maker, and it can take a significant amount of time and energy. With the disclosed systems and processes, that manual process is automated, and the data transformation intelligently provided by the disclosed systems, enabling makers to do rapid prototyping and go directly from content to application. Users of the disclosed systems do not need substantial code proficiency because they are enabled to transform creative content into an application with usable code in the low-to-no code environment of the disclosed systems, relying on machine intelligence of those systems to create code functions and related data structures.

Further, the disclosure improves the functioning of a computing device by enabling automated, consistent creation and development of applications. Additionally, or alternatively, system resources, such as memory resources and/or data storage resources, are conserved due to the described system handling a wide variety of input content that otherwise may require multiple tools to be used.

FIG. 1 is a block diagram illustrating a system 100 configured to generate an application template 139 from input content 106. The system 100 includes an application (app) development platform 102 and a content processing server 104. In some examples, a user 105 provides input content 106 with a content type 108 to the app development platform 102 via a content upload interface 110.

The app development platform 102 and the content processing server 104 are executed or otherwise performed by one or more computing devices (e.g., the device of FIG. 8) of the system 100. In some examples, the app development platform 102 and the content processing server 104 are executed and/or located on a computing device. Alternatively, in other examples, the app development platform 102 is executed and/or located on a first computing device and the content processing server 104 is executed and/or located on a second computing device, where the first and second computing devices are connected and/or in communication via a network connection. Further, in other examples, the app development platform 102 and/or the content processing server 104 are executed and/or located on multiple distributed computing devices connected via one or more network connections (e.g., via an intranet, via the Internet, or the like). In other examples, the app development platform 102 and/or the content processing server 104 are organized in different structures of computing devices without departing from the description.

In some examples, the user 105 provides the content type 108 of the input content 106 when providing the input content 106 to the content upload interface 110 and/or the app development platform 102 and/or content processing server 104 are configured to determine the content type 108 based on data and/or attributes of the input content 106. For instance, the app development platform 102 and/or the content processing server 104 determine the content type 108 of the input content 106 based on a file extension of a file of the input content 106 (e.g., a '.pdf' extension indicates the content type 108 is a PDF document).

In some examples, content types 108 of input content 106 include image screenshots, hand-drawn images, PDF files, POWERPOINT files, and/or FIGMA files. It should be understood that more, fewer, or different types of input content are used in other examples without departing from the description.

Further, in some examples, the content upload interface 110 of the app development platform 102 is configured to enable a user 105 to upload input content 106 as one or more files. Additionally, or alternatively, the content upload interface 110 is configured to enable the user 105 to upload input content 106 using other interface tools, such as an interface tool that can be used to digitally draw the input content 106.

The app development platform 102 is configured to send provided input content 106 to the content processing server 104. The content processing server 104 includes hardware, firmware, and/or software configured to transform or otherwise convert the input content 106 into an application template 139 as described herein. Further, in some examples, the content processing server 104 is configured to enable the user 105 to provide feedback on the application template generation process in conjunction with a content editor interface 112 of the app development platform 102. For instance, as illustrated, the user 105 is enabled to correct the extracted content entities 122 via the content editor interface 112 as described in greater detail below.

The content processing server 104 uses data extractors 116 to extract content entities 122 from the input content 106. In some examples, the data extractors 116 include a set of type-specific extractors 118 (e.g., an image type-specific extractor 120). Upon receiving the input content 106 and an associated content type 108, the content processing server 104 is configured to identify a type-specific extractor 118 that matches the content type 108 and to apply that identified type-specific extractor 118 to the input content 106.

Data extractors 116 are configured to identify and extract content entities 122 from input content 106. In some examples, the data extractors 116 include an image type-specific extractor 120 that is configured to analyze image data of the input content 106 to identify content entities 122 therein. Further, in some such examples, the image-type specific extractor 120 uses image analysis models 124 (e.g., object detection model 126 and/or text recognition model 128) to analyze the image data of the input content 106.

In some examples, the image analysis models 124 are trained using machine learning techniques to identify attributes of image data and/or image files that can be used to determine content entities 122 in that image data. Further, the object detection model 126 is configured and/or trained to identify objects, shapes, or other structures in image data and to determine content entities 122 from those identified structures. For instance, the object detection model 126 detects, in image data, a set of lines that approximately form a rectangle. The object detection model 126 determines a rectangle shape that best fits the set of lines and determines that the content entity 122 most likely to be represented by the set of lines is a button in a GUI.

Additionally, or alternatively, the text recognition model 128 is configured and/or trained to identify text in the image data and determine what the identified text says. That determined information is used by the text recognition model 128 to determine content entities 122 with which that text is most likely to be associated. For instance, the text recognition model 128 identifies text that says "Cancel" and determines that the associated content entity 122 is likely to be a cancel button in a GUI.

Further, in some examples, the image type-specific extractor 120 uses the detected objects of the object detection model 126 and the recognized text of the text recognition model 128 in combination to determine content entities 122 in the input content 106. For instance, in an example, the object detection model 126 detects a line in the image data and the text recognition model 128 detects text that says, "Sign Here", so the image type-specific extractor 120 uses both detected items to determine that the line is a Tillable text box of the GUI that provides a place to enter a signature.

In some examples, the training data used to train the image analysis models 124 includes real and/or synthetic object-based and/or text-based images that have been generated based on aspects of real forms, portals, or other GUIs. The training data further includes a variety of different features, including different object shapes and/or structures and text of various fonts, sizes, and/or styles. Thus, the models 124 are trained to recognize that objects and text that are part of or otherwise associated with content entities of an interface.

In some examples, the models 124 are trained using machine learning techniques. The training of the models 124 include machine learning techniques that use, for instance, a trained regressor such as a random decision forest, a directed acyclic graph, a support vector machine, a convolutional neural network, or other neural network, or another trained regressor. Additionally, or alternatively, the training of the models 124 makes use of training data including the object and text data with the features described above associated with indications of types of content entities as training data pairs when applying machine learning techniques and/or algorithms. Millions of training data pairs (e.g., a large synthetic dataset) may be stored in a machine learning data structure (e.g., of the system 100) for use in training the models 124 and/or other trained models as described herein.

Additionally, or alternatively, the type-specific extractors 118 include extractors associated with digital document content, interface design content, or other types of content. Some extractors 118 are configured to use application program interfaces (APIs) associated with the content type to extract the content entities 122 from associated input content 106 (e.g., an extractor 118 associated with FIGMA interface design content uses FIGMA APIs to extract text, controls, objects, and other metadata or content entities from an input FIGMA file). Other types of extractors 118 are configured to use a combination of type-specific APIs, trained analysis models, and/or other methods to extract the content entities 122 from input content 106. For instance, an extractor 118 of a content type 108 that has text extraction APIs but no APIs for extracting objects or shapes is configured to use an object detection model (e.g., like object detection model 126) to extract objects, shapes, and/or structures in association with text that is extracted using the text extraction APIs.

In some examples, the extracted content entities 122 include text, controls, objects, and other entities that are included in the input content 106. The extracted content entities 122 are entities that can be included in a GUI or other interface of an application template 139 as described herein. Some possible content entities 122 include text labels, text boxes, menus, buttons, check boxes, scrollbars, images, or the like. Further, in some examples, the extracted content entities 122 include metadata that indicates location and/or size of the content entities 122 and the type of the content entities 122 (e.g., a text box-type entity of a GUI with an upper left corner located at a set of coordinates and with a height value and a width value). For instance, in some examples, the image analysis models 124 associated with the image type-specific extractor 120 are configured to determine bounding boxes and types of the extracted content entities 122 based on the image input content 106.

The content processing server 104 is configured to provide the extracted content entities 122 to the normalizers 130. The normalizers 130 include hardware, firmware, and/ or software configured to normalize or otherwise format the content entities 122 into a standard schema (e.g., the normalized content in standard schema 136). Additionally, or alternatively, in some examples, the content processing server 104 is configured to provide the extracted content entities 122 to the user 105 for review via the content editor interface 112 of the app development platform 102.

The content editor interface 112 is configured to display the extracted content entities 122 to the user 105 and enable the user 105 to adjust and/or make corrections to those extracted content entities 122. In some examples, the content entities 122 are displayed to the user 105 as an overlay on the input content 106 or otherwise relative to the input content 106. An example is described below with respect to FIGS. 4A-H. The extraction of the content entities 122 is configured to identify objects, controls, and other structures and to identify key properties of those entities, but in many examples, it is difficult to configure an extractor 116 that can identify those entities 122 with 100% accuracy. This is because, at least in part, there are many different visual representations for each possible content entity 122. For example, a text input box is displayed as a rectangular box in one instance of input content 106, but it is represented as a horizontal line or even blank space in another instance of input content. Furthermore, in some examples, drawn input content 106 includes a horizontal rectangle with some text inside it to represent a text input box. However, that representation of a text input box could also represent a button or other similar control.

After the initial extraction process of the content entities 122, the content editor interface 112 enables the user 105 to correct any issues. In some examples, the content editor interface 112 enables the user 105 to adjust the locations and sizes of the content entities 122 relative to each other and/or relative to the background. Further, the content editor interface 112 enables the user 105 to change text (e.g., if the text recognition model 128 identified a word or letter incorrectly) and/or to change the type of the content entities 122 entirely (e.g., if the extractor 116 identified an entity as a text box when it is supposed to be a button). Additionally, or alternatively, the content editor interface 112 enables the user to remove content entities 122 and create new content entities 122, including defining bounding boxes, types, and locations of the new entities 122. An example of the content editor interface 112 is described in greater detail below with respect to FIGS. 4A-H.

Further, in some examples, the results of the user editing the content entities 122 are used as training data to improve the performance of the image analysis models 124. For instance, the original image data of the input content is paired with the edited content entities 122 as a set of training pairs, training the models 124 to be more likely to extract content entities similar to the edited content entities 122 based on image data that is similar to the image data of the input content 106.

Returning to the normalizers 130, in some examples, the normalizers 130 include type-specific normalizers 132 (e.g., an image type-specific normalizer 134). Different types of input content 106 are likely to have extracted content entities 122 with different types of attributes and relationships. In many examples, such differences are addressed by configuring type-specific normalizers 132 to normalize and/or adjust the layout and other aspects of the content entities 122. In some examples, such normalization includes grid normalization that adjusts the locations of the content entities 122 to line up with the lines of a grid (e.g., adjusting a column of text boxes to exactly line up with the same vertical line, adjusting text labels of entities to be left justified to another vertical line, etc.). Additionally, or alternatively, other operations are performed during normalization, such as adjusting sizes and fonts of text to match or otherwise meet consistent style requirements, adjusting colors of entities to match a set of defined palette colors, adjusting the layout of the content entities 122 based on a selected interface orientation (e.g., phone or tablet orientation), or the like. Normalization by the normalizers 130 enables the system 100 to generate a consistent, well-organized application template 139 from input content 106 that is relatively imprecise.

After the content entities 122 have been transformed into normalized content in standard schema 136, that normalized content 136 is provided to the application (app) template generator 138 and an application template 139 is generated. The app template generator 138 includes hardware, firmware, and/or software configured to generate an application template 139 that can be used to develop an associated application quickly and efficiently. In some examples, the app template generator 138 uses the metadata of the content entities 122 in the normalized content 136 to determine the types of operations, functions, or other code structures that are likely to be used with the normalized content 136 as an interface. For instance, in an example, the app template generator 138 uses metadata of a button content entity 122 to generate a method stub associated with activation of the button in the application template 139, such that the user 105 is enabled to quickly define the operations to be performed when the button is activated in the application. In another example, the app template generator 138 uses metadata of several text box entities 122 to determine that a data table or other structure is likely to be necessary to store the data provided to the text boxes. As a result, the app template generator 138 creates an empty table associated with the application template 139 such that the text boxes are linked to entries in the table, enabling a user to use and/or adjust the table functionality when developing an application from the application template 139. In other examples, the app template generator 138 is configured to perform more, fewer, or different operations to generate the application template 139 without departing from the description.

Additionally, or alternatively, in some examples, metadata that is extracted from the input content 106 can be used to generate complete and/or partial formulas and/or functions in association with the content entities 122 (e.g., in generating an application template from input content 106 of a FIGMA content type 108, the input content 106 often includes sufficient metadata for the generation of precise formulas for use in the generated application in association with the content entities thereof).

The application template 139 is provided to the application template interface 114 of the app development platform 102 to enable the user 105 to further develop an application from the application template 139. In some examples, the application template 139 is displayed to the user 105 via the application template interface 114, including a GUI of the application template 139 and/or backend code or other entities of the application template 139 (e.g., stub functions associated with entities of the application template 139, data storage entities such as tables associated with portions of the application template 139, or the like). The application template interface 114 further enables the user 105 to make changes to the application template 139 and to expand and/or specify configuration and/or settings of the application template 139 to convert the template 139 into a specific application. For instance, in an example, the user 105 is enabled to write code to define functionality of the application associated with a button entity of the application template 139 and/or the user is enabled to link entities of the application template 139 to a database or other data structure configured to store data associated with the new application. In other examples, users 105 are enabled to perform more, fewer, or different activities without departing from the description.

Figure 2:
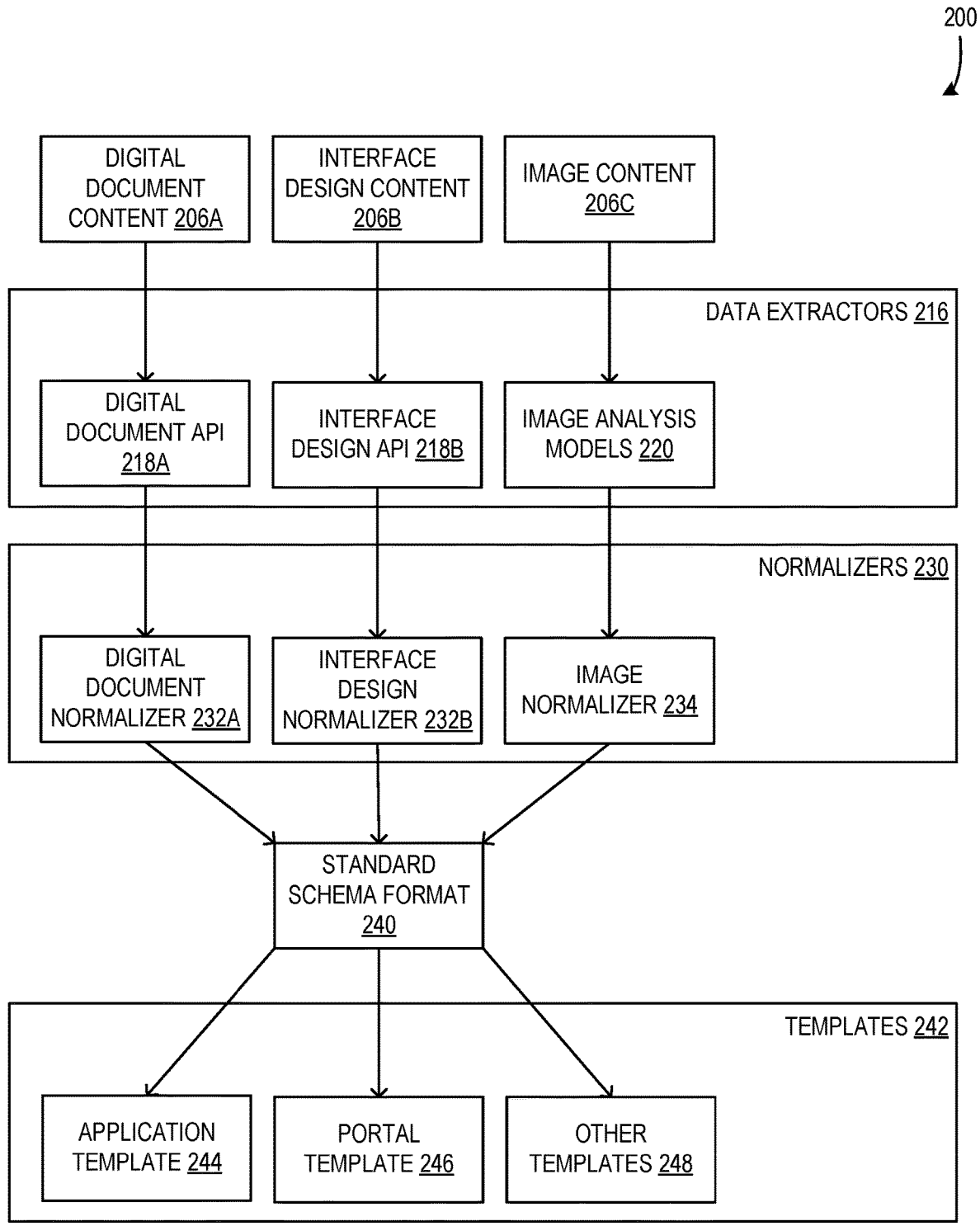
FIG. 2 is a block diagram illustrating a system configured to generate application templates from a plurality of different types of input content.

FIG. 2 is a block diagram illustrating a system 200 configured to generate application templates 242 from a plurality of different types of input content 206A-C. In some examples, the system 200 is part of or otherwise associated with a system such as system 100 of FIG. 1. The system 200 includes multiple paths for input content transformation based on the type of the input content and on the type of the template into which the input content is being transformed. For instance, the types of input content include digital document content 206A (e.g., a PDF document), interface design content 206B (e.g., a FIGMA file), and/or image content (e.g., a hand-drawn layout in an image file).

Depending on the type of input content, a matching type of data extractor 216 is used as described herein. For instance, for the digital document content 206A, a matching digital document API 218A is used to extract the content entities. In an example, PDF-based APIs are used to extract content entities from a PDF document. Additionally, or alternatively, for the interface design content 206B, a matching interface design API 218B is used to extract content entities (e.g., FIGMA-based APIs used to extract entities from a FIGMA file) and/or for image content 206C, image analysis models 220 are used to extract content entities, as described herein with respect to image analysis models 124 in FIG. 1.

Similarly, after the extraction process, the extracted content entities are normalized by different normalizers 230 based on the type of the input content. For instance, in some example, for content entities from the digital document APIs 218A, a digital document normalizer 232A is used to normalize the content entities into a standard schema format 240, for content entities from the interface design APIs 218B, an interface design normalizer 232B is used to normalize the content entities into the standard schema format 240, and/or for content entities from the image analysis models 220, an image normalizer 234 is used to normalize the content entities into the standard schema format 240. Further, in other examples, more, fewer, or different types of normalizers are used to normalize input content entities in the standard schema format 240. It should be understood that normalized content entities from any type of input content in the standard schema format 240 are formatted according to the same format.

Additionally, or alternatively, in some examples, normalized content entities in the standard schema format 240 are used to generate one or more different types of templates 242. For instance, normalized content entities are used to generate an application template 244 as described herein with respect to the application template generator 138 of FIG. 1. Alternatively, or additionally, normalized content entities are used to generate a portal template 246 and/or other templates 248 using different types of template generators and/or different configurations of template generators. An application template 244 enables a user to develop an application and a portal template 246 enables a user to develop a portal (e.g., a web-based application that enables a user to access other applications or data that are otherwise secured) based on the normalized content entities in the standard schema format 240.

Further, in some examples, the normalized content entities are directly included or otherwise added into the target template without using the standard schema format 240.

FIGS. 3A-D are diagrams illustrating a process of generating an application from input image content. In some examples, the process of FIGS. 3A-D are executed or otherwise performed on a system such as system 100 of FIG. 1 as described herein.

Figure 3A:
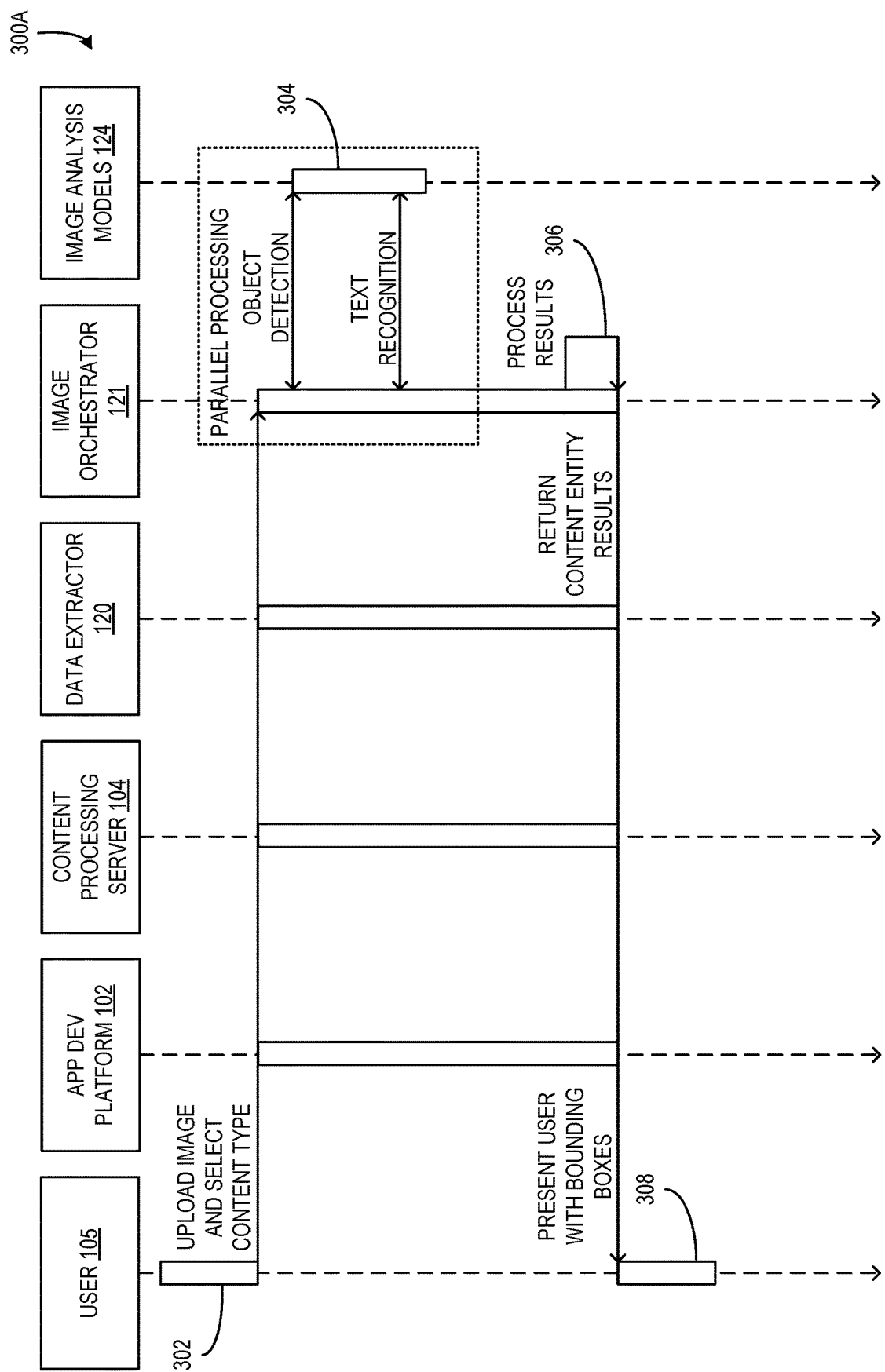
FIGS. 3A-D are diagrams illustrating a process of generating an application from input image content.

FIG. 3A is a diagram illustrating a process 300A of a user 105 uploading input image content (e.g., input content 106) and the system extracting content entities (e.g., content entities 122). At 302, the user 105 uploads an image to the app development platform 102 and selects a content type of 'image'. The app development platform 102 sends the uploaded image to the content processing server 104, which processes the image using the data extractor 120.

Specifically, the data extractor 120 uses an image orchestrator 121 and image analysis models 124 (e.g., an object detection model 126 and a text recognition model 128) to extract content entities 122 at 304. The image orchestrator 121 is configured to control the operations of the multiple image analysis models 124 and to process the results of those models at 306. In some examples, processing the results at 306 by the image orchestrator 121 includes combining the results from each of the image analysis models 124 to identify the locations of content entities 122 in the image and to classify those content entities 122 with entity types (e.g., a location of a text box entity is determined, and it is classified as a text box based on the results from both the object detection model and the text recognition model).

The processed content entity results are returned by the image orchestrator 121 and/or the data extractor 120 more generally to the app development platform 102 where the results are presented to the user 105 with bounding boxes at 308. In some examples, the bounding boxes are overlaid on the uploaded image and classifications of the identified content entities is provided with the bounding boxes, enabling the user 105 to review the entities that were extracted by the data extractor 120. For instance, in some examples, the image is displayed with color-coded bounding boxes overlaid on the image, with each color of the color-coded bounding boxes representing a type of content entity (e.g., a text box has a blue bounding box, a text label has an orange bounding box, and/or a button entity has a red bounding box). The color coding is displayed in the interface of the app development platform 102 so that it can be interpreted by the user 105.

Figure 3B:
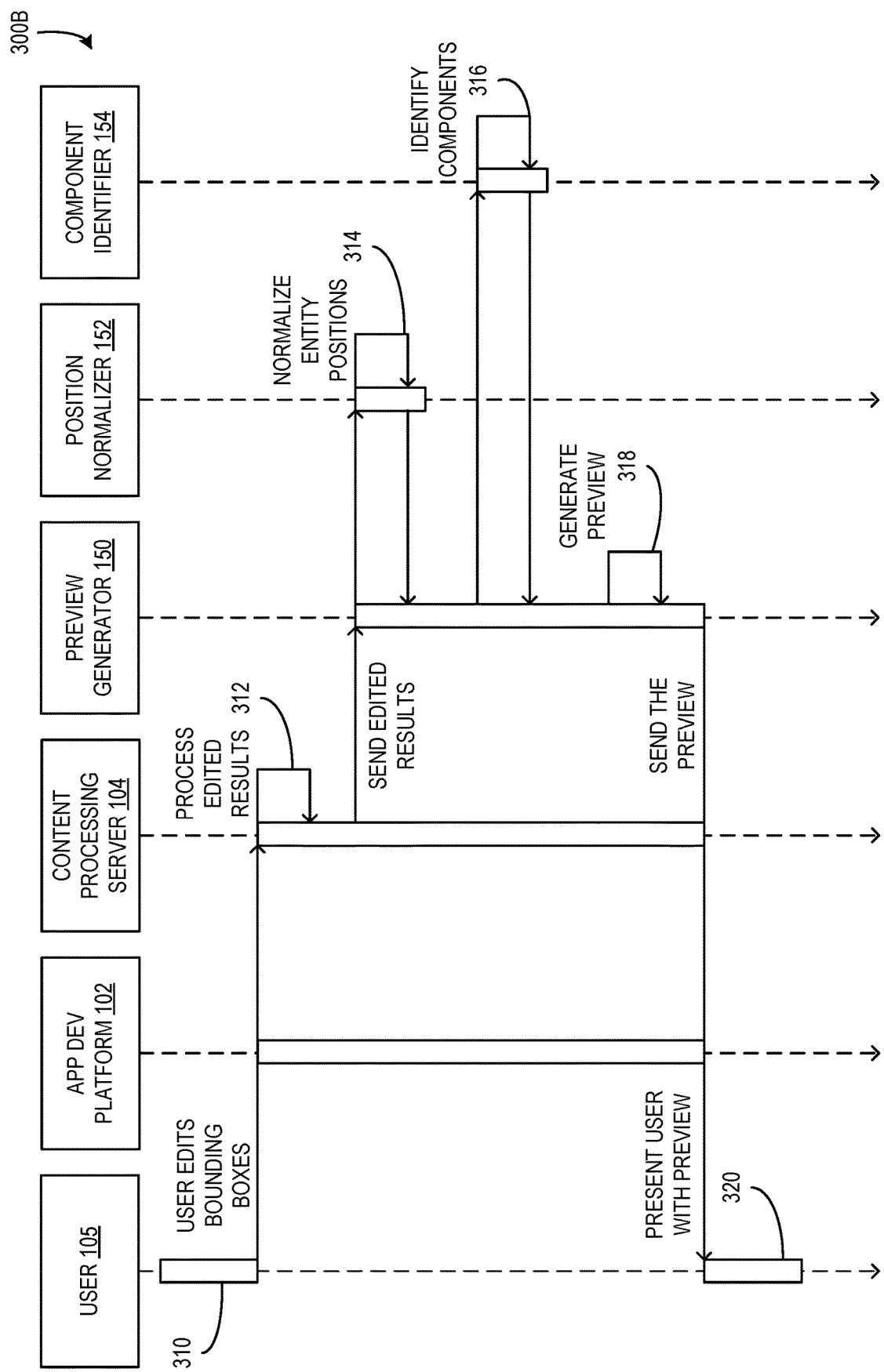

FIG. 3B is a diagram illustrating a process 300B of a user 105 editing bounding boxes of content entities and the system generating a preview based on the edited bounding boxes. In some examples, the process 300B occurs after the process 300A of FIG. 3A described above.

At 310, the user 105 edits bounding boxes of provided content entities using an interface of the app development platform 102. The user 105 is enabled to change the size of the bounding boxes, change the type of the content entities associated with the bounding boxes, and/or add new bounding boxes to the set of bounding boxes representing new content entities and/or content entities that the extractor 120 failed to identify. The user 105 is enabled to send the edited bounding boxes to the content processing server 104 via the app development platform 102.

The content processing server 104 processes the edited results at 312 and then those results are sent to the preview generator 150. The preview generator 150 is configured to use a position normalizer 152 and a component identifier 154 to generate an application preview from the content entities and associated bounding boxes. The position normalizer 152 is configured to normalize the positions of the content entities at 314. In some examples, the normalization process includes adjusting the positions of the bounding boxes of the content entities match a grid of vertical lines and/or a grid of horizontal lines. The positions of the bounding boxes of the content entities are adjusted to the nearest lines of the grid such that the content entities are aligned consistently throughout the generated preview. Additionally, or alternatively, the positions of the bounding boxes are adjusted to be consistently spaced from each other and/or to group subsets of the content entities together (e.g., if the content entities include a group of check boxes, the position normalizer 152 adjusts the positions of the check boxes to be closer together than they are to other content entities).

Further, a component identifier 154 is used to identify the components of the preview from the content entities at 316. In some examples, identifying the components of the preview include identifying components to be associated with the content entities in the generated preview. The component identifier takes a set of content entities (e.g., check boxes, buttons, text input, text labels, etc.) and recognizes that some of the content entities should be grouped together to form a component of the app template being generated. Such components represent organized collections of individual entities that adhere to specific formats and/or styles and that are used for specific purposes (e.g., a text label and text input are identified as a text input component and the specific type of text input is indicated by the text label). For instance, in some examples, the component identifier 154 identifies that a particular form (e.g., a container that consists of a set of content entities used for specific purposes) is needed for use with the preview and/or a particular data table is needed for storing data of the preview. Additionally, the component identifier 154 uses metadata of the content entities, including the types of the content entities and the normalized positions of the content entities. The identified components are provided to the preview generator 150 and the preview generator 150 is configured to use the normalized content entities and identified components to generate a preview of an application at 318. Additionally, in other examples, a component identifier 154 is used to identify components for the app template being generated without the use of a preview generator 150.

The generated preview is sent to the app development platform 102 and presented to the user 105 at 320. In some examples, the generated preview includes a GUI representing the normalized content entities and/or any components that were identified by the component identifier 154 (e.g., a data table for storing data collected by the GUI is indicated in the preview and/or a form generated for interacting with the GUI is indicated in the preview).

In some examples, more, fewer, or different processing is performed on the content entities and associated bounding boxes without departing from the description. For instance, in some examples, a design idea API (e.g., an API of the POWERPOINT application that returns slide design templates as design ideas) is used to control the appearance of the content entities of the application and/or application template. Additionally, or alternatively, a design idea API is configured to return one or more design ideas based on keywords and/or other details of the application or application preview. A design idea is a set of appearance-based settings that can be applied to the application template and/or an associated application at the preview stage, at the end of the generation process, and/or at other stages of the generation process (e.g., a design idea is applied to an HTML file of the preview) to generate a consistent appearance across all displayed content entities. In some examples, the design ideas include different color schemes, different sets of icons, different font options, or the like. The design ideas are also provided to the user 105, enabling the user 105 to select a design idea from the provided set of design ideas. The user 105 is further enabled to select each design idea such that it is applied to the application, application template, and/or specific aspects thereof, such as an HTML preview, enabling the user 105 to view the effects of each design idea prior to choosing one.

Figure 3C:
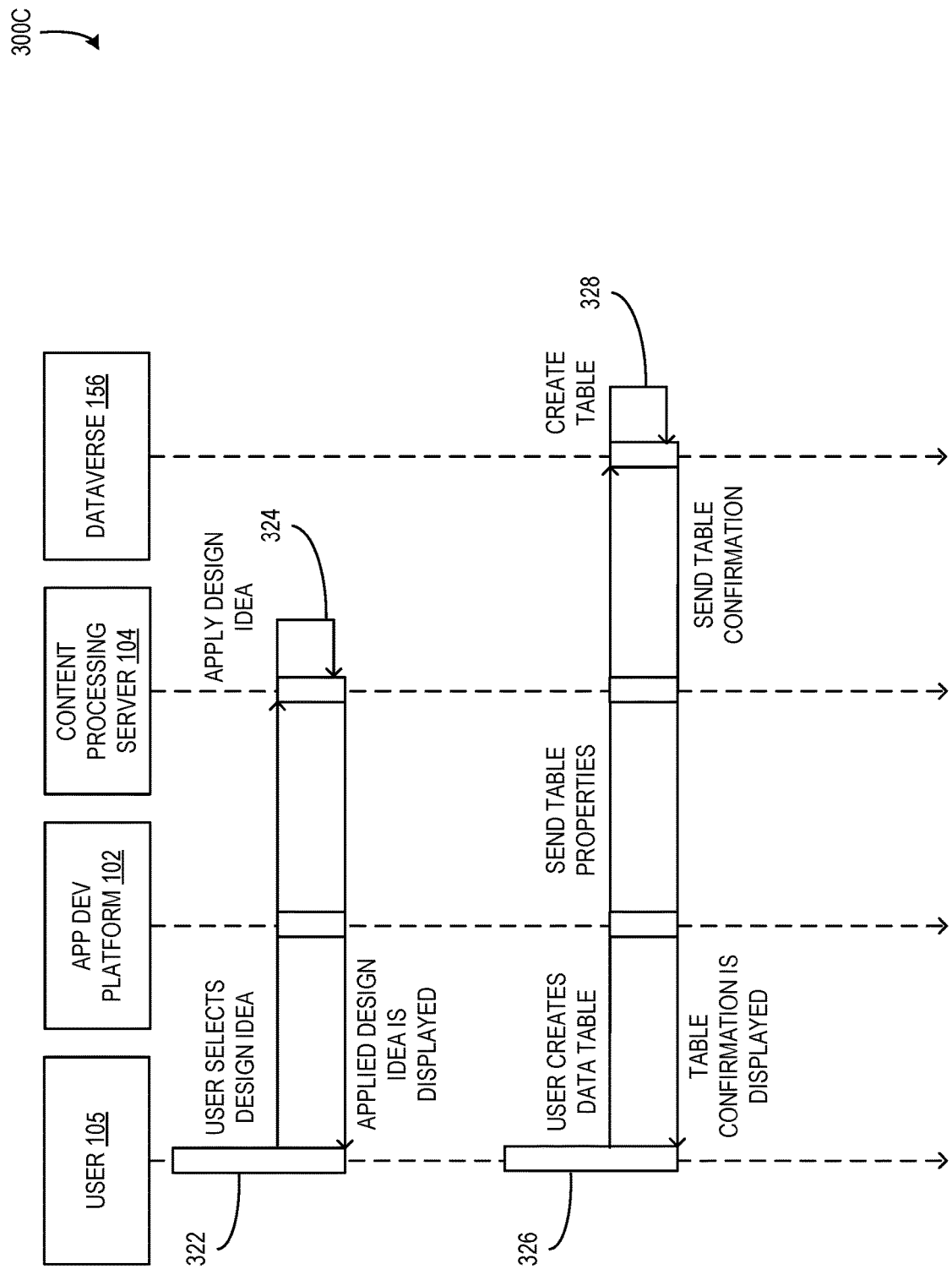

FIG. 3C is a diagram illustrating a process 300C of a user 105 selecting a design idea and configuring a data table for use with an application preview. In some examples, the process 300C follows the process 300B of FIG. 3B as described above. At 322, the user 105 selects a design idea included with the application preview as described above. The selected design idea is sent to the content processing server 104 via the app development platform 102 and the design idea is applied to the application preview at 324. The application preview with the applied design idea is returned to the app development platform 102 and displayed to the user 105.

At 326, the user selects to create a data table for the application preview and the table properties of the data table are sent to the content processing server 104. The content processing server 104 creates the data table according to the table properties in a Dataverse 156 at 328. In some examples, the table properties include a set of columns of the table and metadata associated with those columns, such as data types to be stored in those columns. Some or all the columns are associated with content entities of the application preview (e.g., text box of the application preview is linked to a column of the data table such that data entered in the text box is stored in that column). After the data table is created, a table confirmation is sent to the user 105 via the app development platform 102.

Figure 3D:
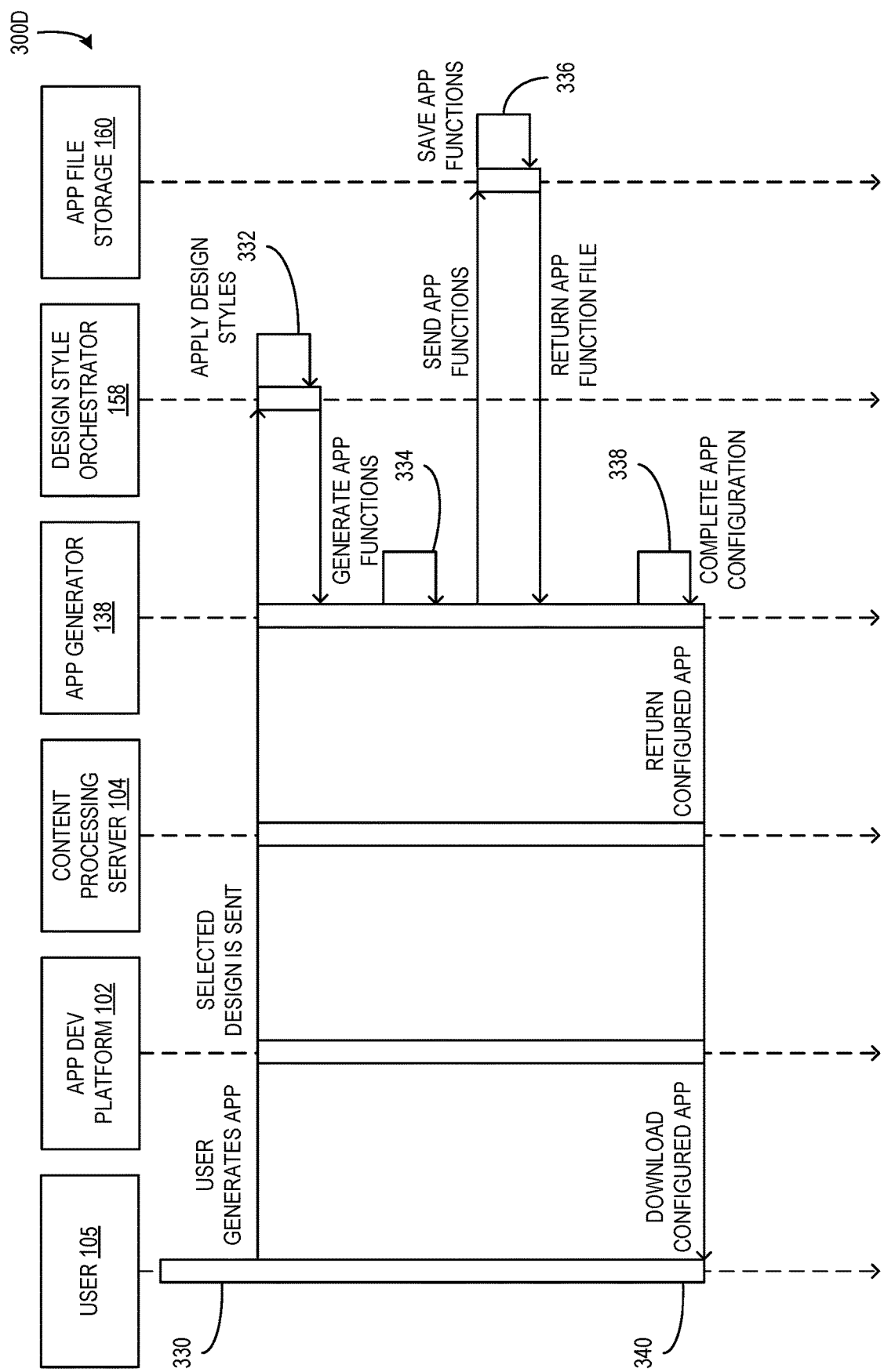

FIG. 3D is a diagram illustrating a process 300D of a user 105 generating an application from an application preview. In some examples, the process 300D follows the process 300C of FIG. 3C as described above. At 330, the user 105 selects to generate an application from the application preview provided by the app development platform 102. The selected design is sent to the content processing server 104 via the app development platform 102. The content processing server 104 uses the app generator 138 to generate the application. In some examples, the app generator 138 uses a design style orchestrator 158 to apply the design styles selected by the user 105 at 332. The design styles applied include color schemes, font styles, component shape and/or line styles, or the like.

Additionally, or alternatively, the app generator 138 generates application functions at 334. In some examples, the application functions generated include functions that are executed or performed based on a user interacting with the application, such as functions that are performed when a button is activated and/or when a text box is filled. Further, generated functions include functions configured to manage data associated with the application, such as functions to populate a data table associated with the application (e.g., when boxes of the GUI of the app are filled with data entries, a function is configured to write those data entries to a data table associated with the application). In some examples, the generated functions are POWER FX functions.

Further, the app generator 138 sends the generated app functions to an app file storage 160 to save the app functions at 336. In some examples, the app functions are saved in a file such as a YAML Ain't Markup Language (YAML) file. The app function file is returned to the app generator 138 and the app generator 138 completes the application configuration at 338. In some examples, completing the configuration includes combining the GUI of the app with the applied design styles with the functions of the app function file.

The configured application is provided to the user 105 by the content processing server 104 via the app development platform 102 and the user 105 downloads the configured application at 340. The configured application is then ready for use. Alternatively, in other examples, the configured application is not downloaded by the user, and it is accessed in other ways. For instance, in some examples, the user is directed to a context where the application is read for use (e.g., within the platform, via a web interface, etc.).

Figure 4B:
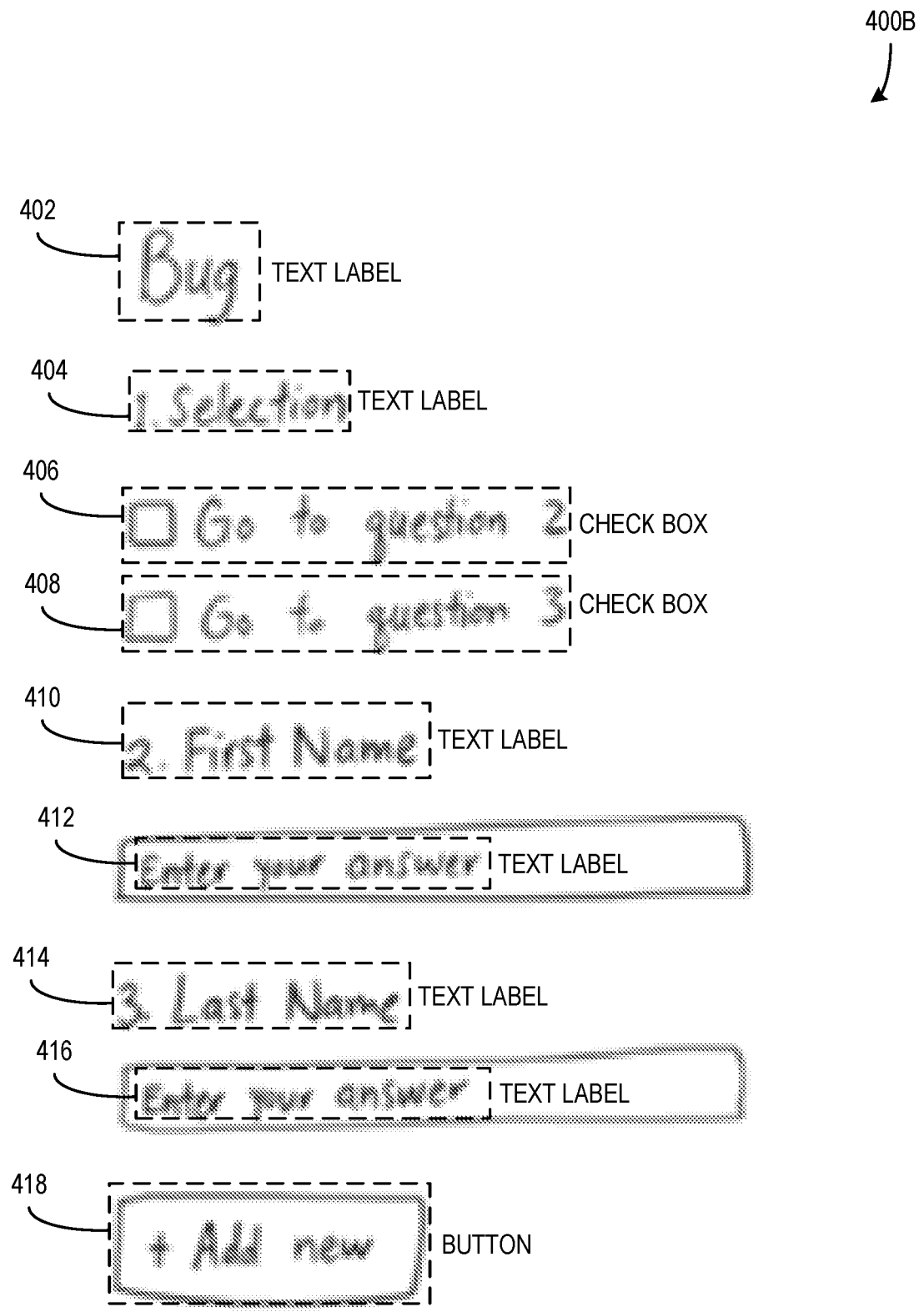

FIGS. 4A-H are diagrams illustrating a GUI enabling a user to generate an application from an image. In some examples, the GUIs of the FIGS. 4A-H are generated and/or displayed in a system such as system 100 of FIG. 1. FIG. 4A is an image 400A of a hand-drawn interface that is displayed on a GUI of an app development platform (e.g., app development platform 102). The image 400A includes a variety of words, numbers, and/or boxes.

FIG. 4B is a GUI 400B that displays the initially extracted content entities (e.g., a GUI of the content editor interface 112 of the app development platform 102). Each extracted content entity is identified by a bounding box (e.g., the dotted line boxes) and an entity type (e.g., the text beside the bounding boxes). Entities 402 and 404 are determined to be text labels, entities 406 and 408 are determined to be check boxes, entity 410 is determined to be a text label, entities 410, 412, 414, and 416 are determined to be text labels, and entity 418 is determined to be a button. In an example, a user reviews the bounding boxes and the entity types to confirm that they are correct or to adjust them to correct any errors. In the illustrated example, the entities 412 and 416 have incorrect bounding boxes and types, as they are intended to be text input boxes rather than text labels. Additionally, or alternatively, the data of the extracted content entities includes key information about the various entities (e.g., button, text label, check box, etc.), their properties (e.g., height, width, etc.), and their styles (e.g., color, font, etc.).

Figure 4C:
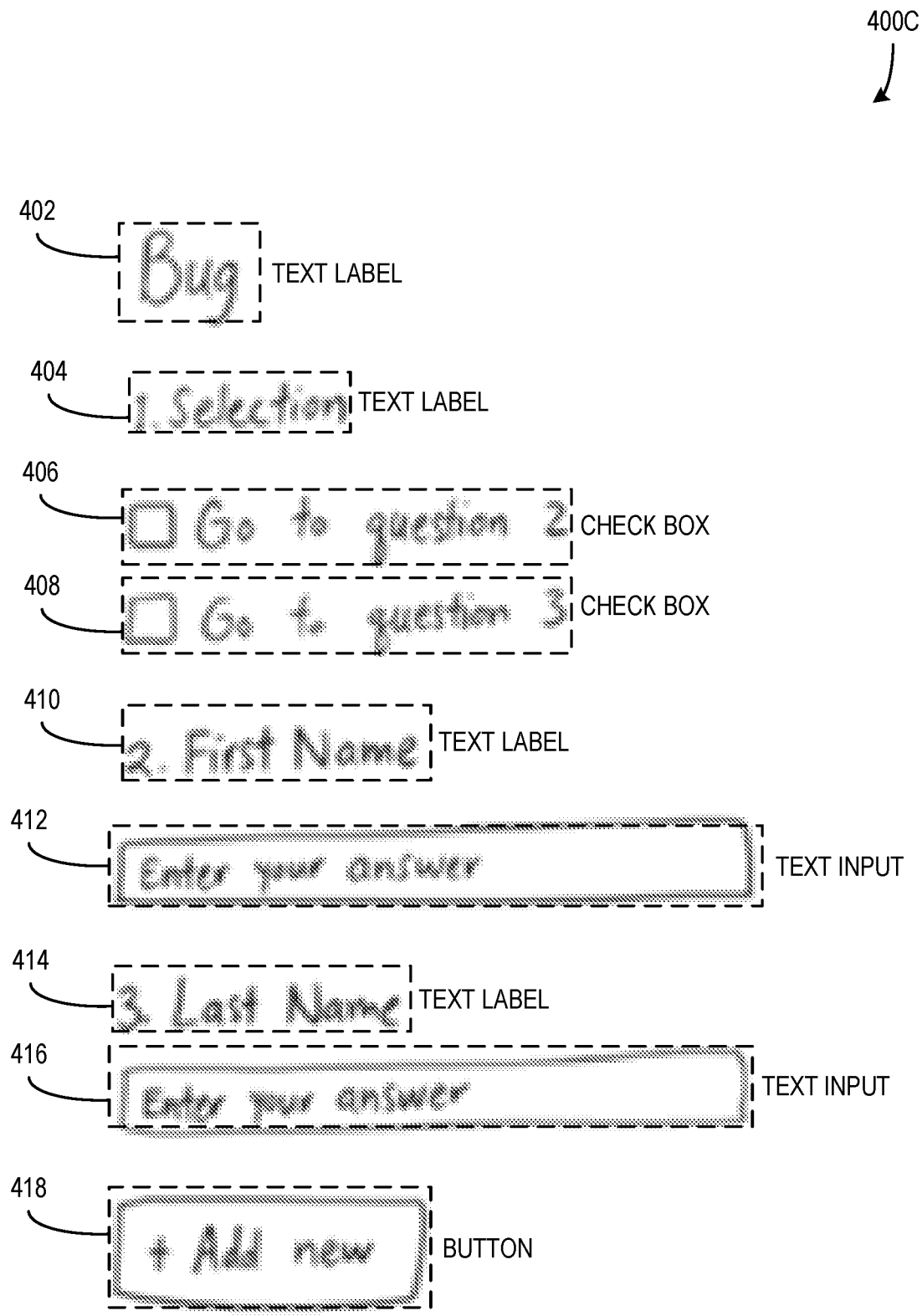

FIG. 4C is a GUI 400C that displays the content entities after the user has adjusted them. The user has left most of the content entities alone, but they have increased the sizes of the bounding boxes for entities 412 and 416 and they have changed the types of those entities to be text inputs. These changes will enable the system to accurately normalize those entities as text inputs, instead of treating them as text labels.

Figure 4D:
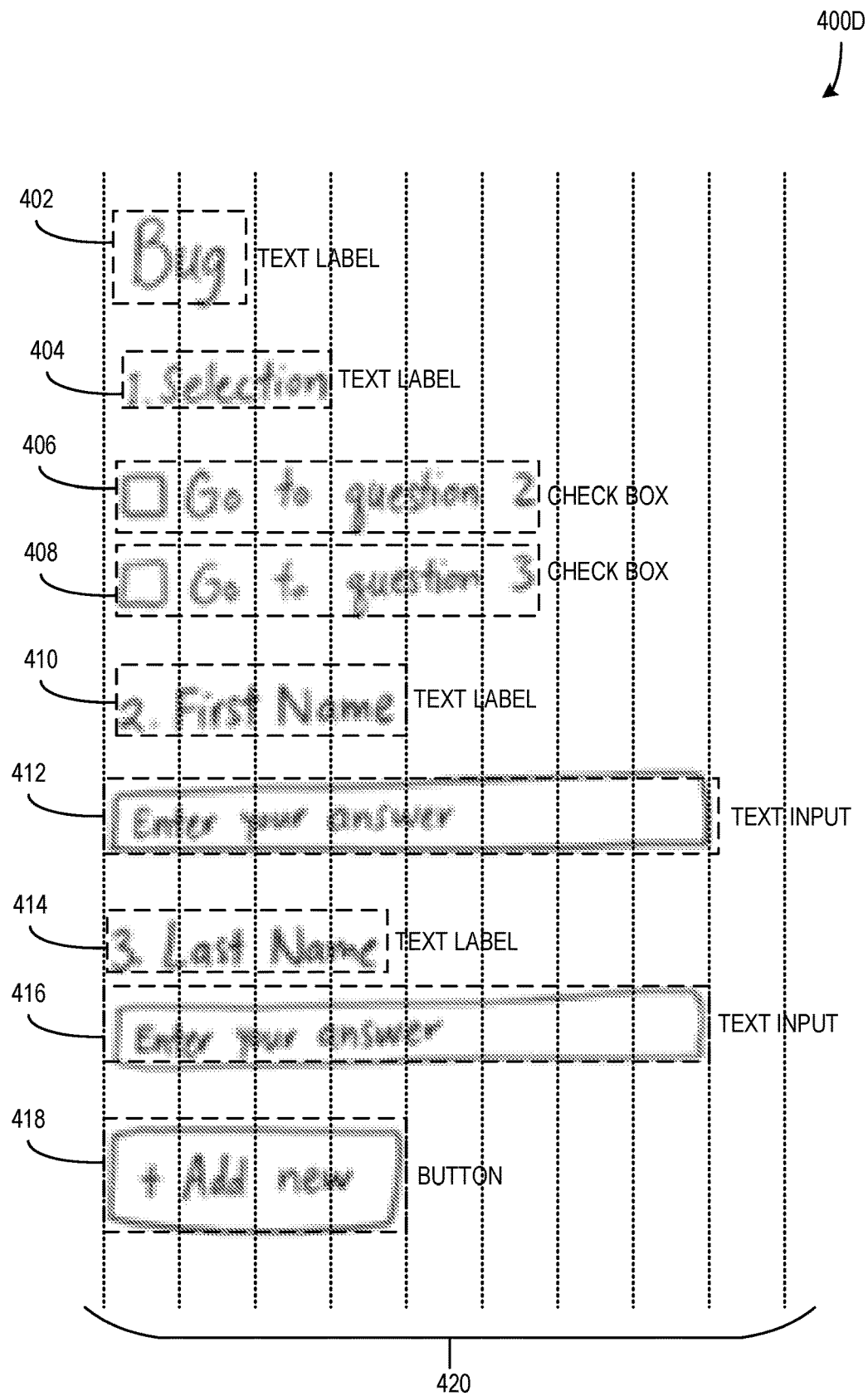

FIG. 4D is a GUI 400D that displays the content entities and a set of grid lines 420 for normalizing the position of the content entities. The grid lines 420 are positioned at regular intervals and are used by the system to ensure that the content entities are lined up vertically. In the illustrated example, the entities 412, 416, and 418 are lined up on the farthest left grid line 420. In some examples, the system determines that that grid line 420 is the line that most content entities are closest to and, as a result, the system adjusts the positions of the other content entities (e.g., 402-410 and 414) to line up with that grid line 420. Alternatively, or additionally, the other grid lines 420 are used for some of the content entities based on a selected format or style (e.g., the check boxes 406 and 408 are aligned with the second grid line 420 from the left so that they appear to be indented relative to the text label 404). Other normalization methods are used, such as normalization of the height of text of the content entity types (e.g., height, size, and/or style of text for all text inputs is consistent).

Figure 4E:
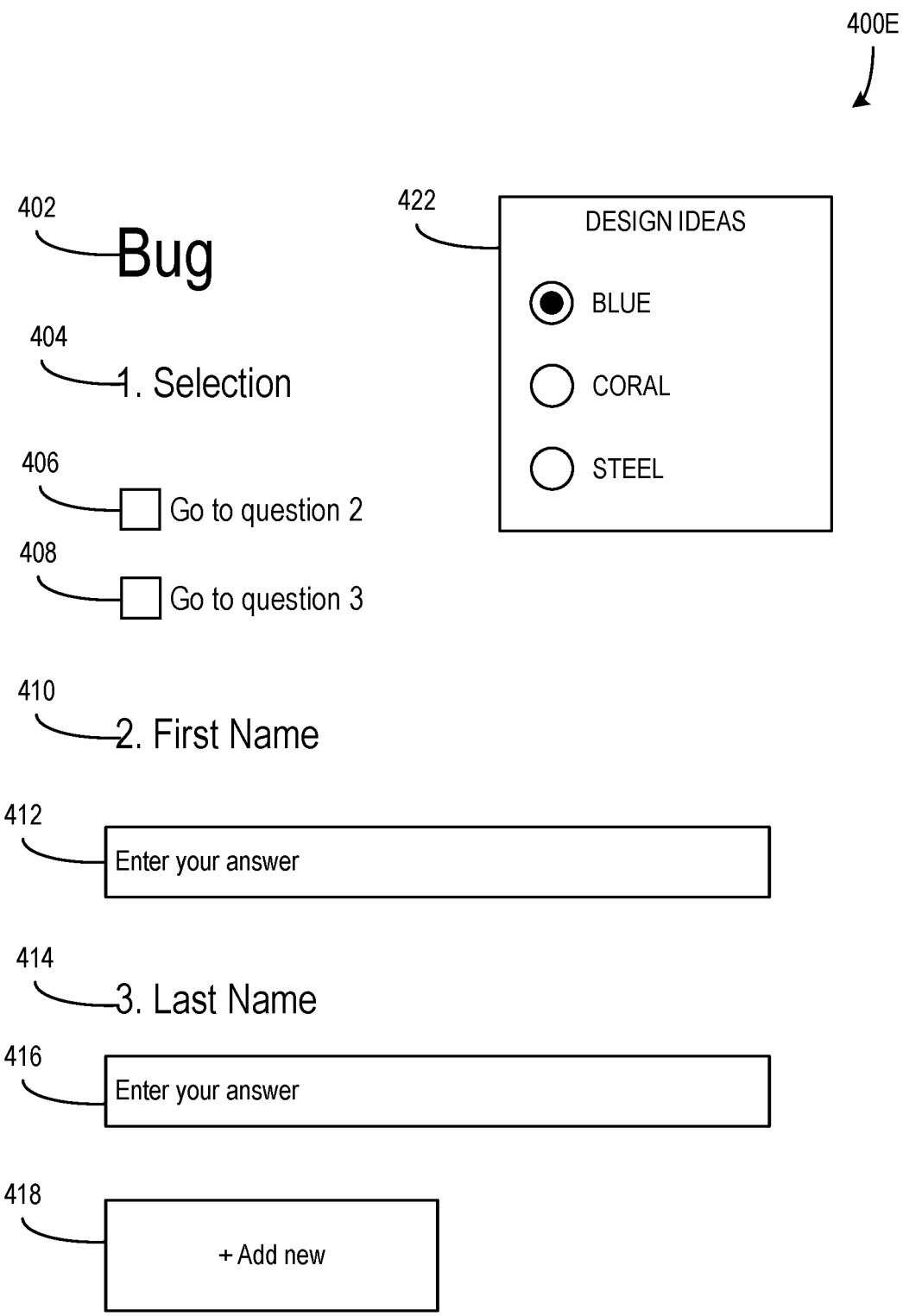

FIG. 4E is a GUI 400E displaying an app preview based on the extracted, adjusted, and normalized content entities. Each of the content entities is generated and normalized according to the data extracted from the original image. For instance, the text label 402 is formatted to be larger text than the text label 404 based on size differences of those content entities from the original image. Additionally, or alternatively, form formatting is detected based on the positions, types, and/or other relationships of the content entities. For instance, in an example, the text label 410 is paired with a text input 412, indicating that the text label 410 describes the information to be entered in the text input 412. In some examples, such relationships are determined based on defined form relationship rules and/or a trained form relationship model.

Further, in some examples, a set of possible design ideas 422 is displayed. In the illustrated example, the design ideas 422 include color schemes of 'blue', 'coral', and 'steel' and the current displayed color scheme is 'blue'. In other examples, other color schemes are provided and/or other types of design ideas are provided (e.g., design ideas that determine font styles, design ideas that determine line or shape styles, or the like).

Figure 4F:
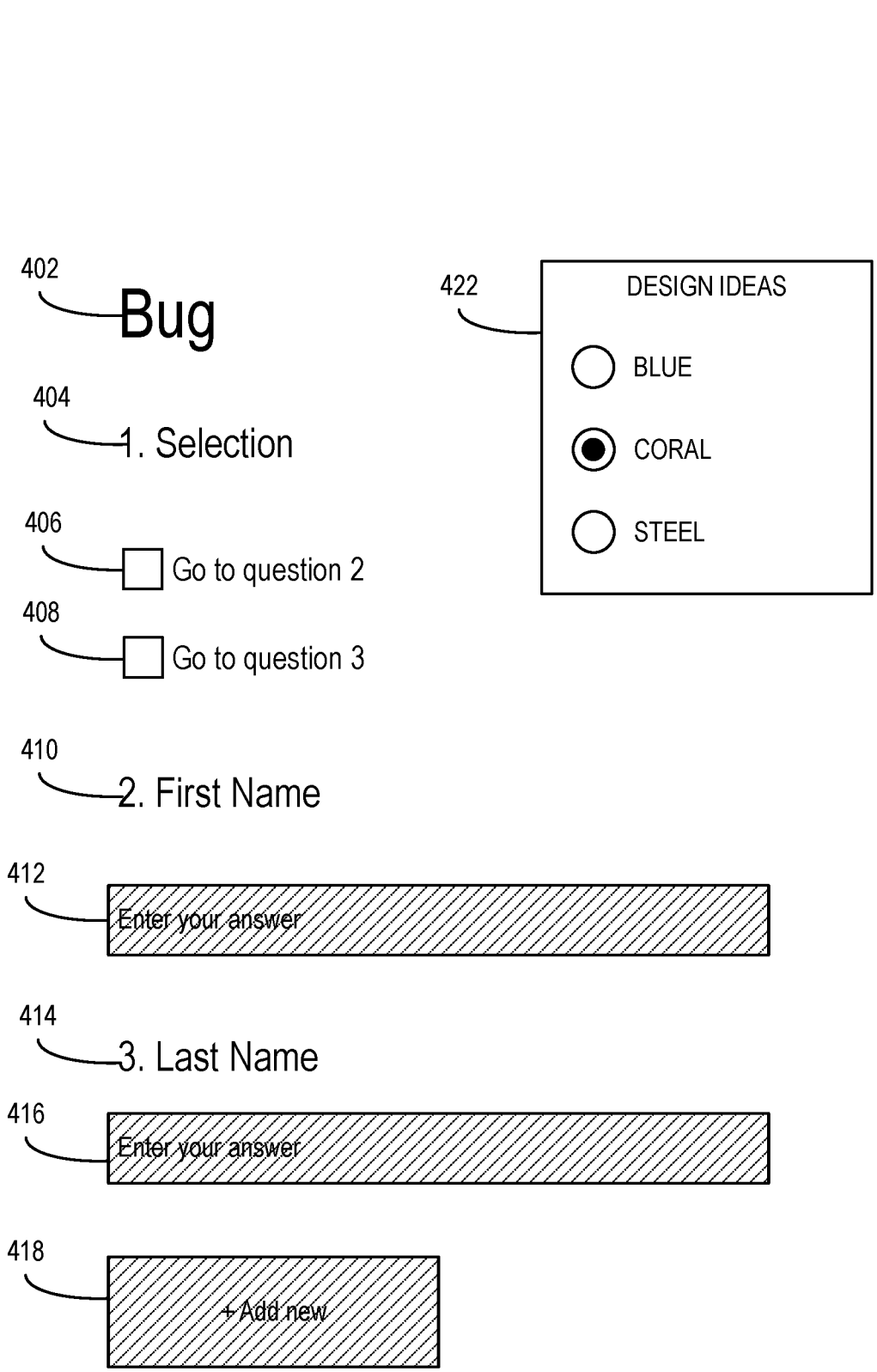

FIG. 4F is a GUI 400F displaying the app preview of GUI 400E with a different design idea selected. As illustrated, the design idea of the preview has changed from 'blue' to 'coral' and, as a result, the colors of some of the entities have changed, represented by the changed fills of the text inputs 412 and 416 and the button 418. Thus, the selecting different design ideas 422 enables the user to view the app review with the selected design ideas applied.

Figure 4G:
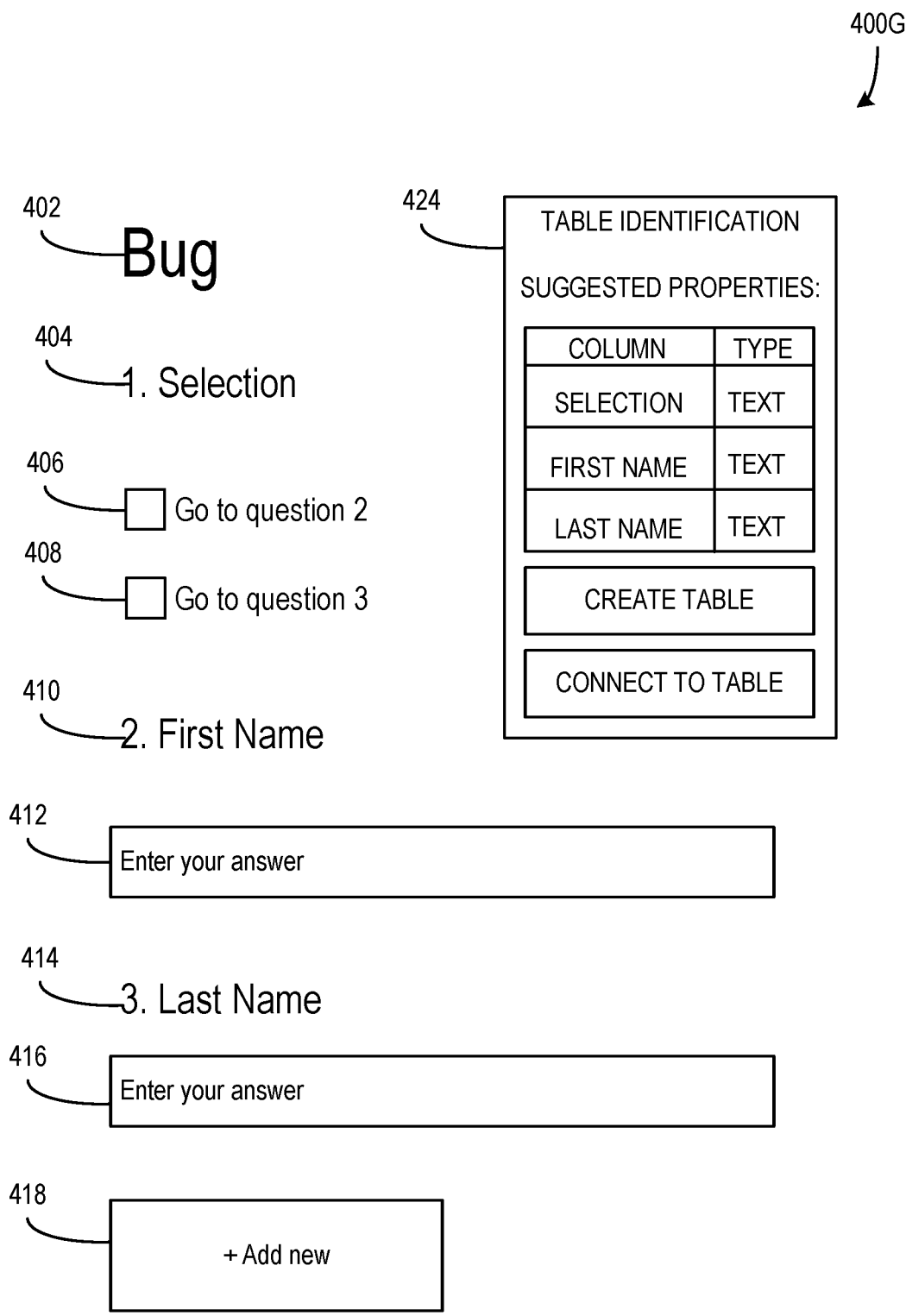

FIG. 4G is a GUI 400G displaying an app preview based on the extracted, adjusted, and normalized content entities with a table identification component 424. In some examples, the system is configured to identify possible data structures such as tables that can be used to store data associated with the app preview GUIs. The data table identification component 424 is displayed to recommend that the table be created to store the data entered in the GUI. In the illustrated example, the recommended table columns include a selection column linked to the entities 404, 406, and 408, a first name column linked to the entities 410 and 412, and a last name column linked to the entities 414 and 416. The table identification component 424 enables the user to create the recommended table as a new table or to connect the GUI to an existing table. Further, in some examples, the table identification component 424 is configured to enable a user to change the properties of the displayed table and/or to create a custom data table or other structure and link it to the entities of the GUI.

Figure 4H:
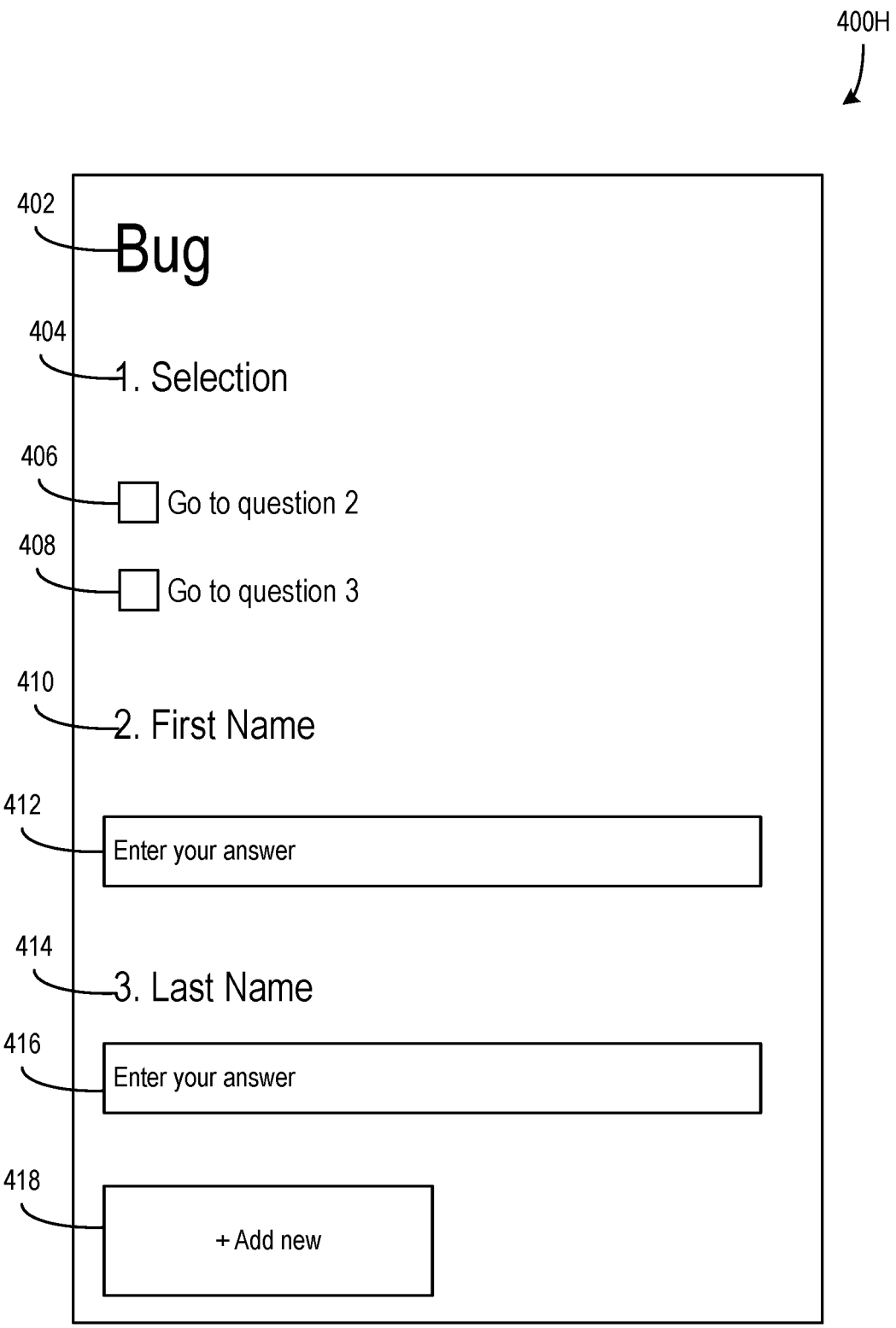

FIG. 4H is a GUI 400H displaying a generated application based on the app preview. In some examples, the code required to generate the application is stored in YAML files and packaged as a '.msapp' file, which can be downloaded by a user. Further, in some examples, the new application can be loaded into another application development platform (e.g., POWER APPS STUDIO for developing POWER APP applications) that can be used to continue building and/or designing the application. Additionally, or alternatively, in some examples, the generated application displayed in the GUI 400H is ready to use by the user.

Figure 5:
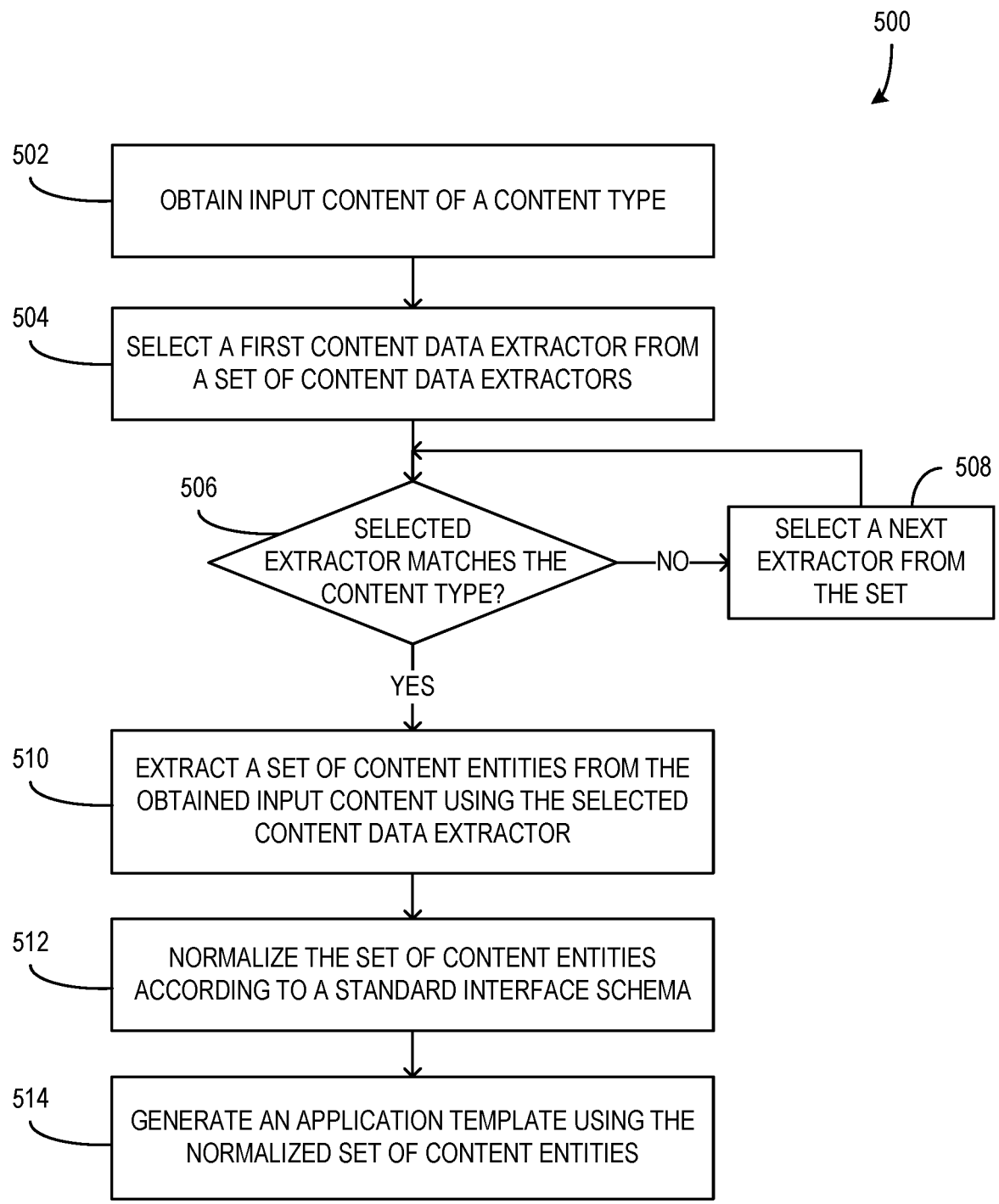
FIG. 5 is a flowchart illustrating a computerized method for generating an application template from input content of a content type.

FIG. 5 is a flowchart illustrating a computerized method 500 for generating an application template (e.g., application template 139) from input content (e.g., input content 106) of a content type (e.g., content type 108). In some examples, the method 500 is executed or otherwise performed in a system such as system 100 of FIG. 1. At 502, the input content of the content type is obtained. For instance, in an example, a user of a system uploads the input content to the system via a content upload interface (e.g., content upload interface 110). In some examples, the input content is of at least one of the following content types: an image type (e.g., a hand-drawn image or a screen shot), a digital document type (e.g., a PDF document), an interface design type (e.g., a FIGMA file), and a presentation design type (e.g., a POWERPOINT presentation file).

After the input content is obtained, the system selects a content data extractor based on the content type of the input content. At 504, a first content data extractor is extracted from the set of content data extractors. At 506, if the selected extractor does not match the content type of the input content, the process proceeds to 508. Alternatively, if the selected extractor does match the content type of the input content, the process proceeds to 510. In other examples, an extractor that matches the content type of the input content is selected using other methods without departing from the description.

At 508, a next extractor is selected from the set of content data extractors and the process returns to 506.

At 510, after the extractor that matches the content type of the input content is selected, a set of content entities is extracted from the input content using the selected content data extractor. Extracted content entities include text labels, text boxes, buttons, check boxes, menus, scrollbars, or the like. In some examples, the extractor analyzes the input content using one or more trained models (e.g., image input content is analyzed using an object detection model and/or a text recognition model as described herein). Alternatively, or additionally, the extractor uses APIs specific to the type of the input content to extract the content entities (e.g., a FIGMA-based input document is processed using FIGMA APIs to extract the content entities).

In some examples, after the content entities are extracted from the input content, those content entities are provided to a user for review. The extracted content entities are displayed on a content editor interface (e.g., content editor interface 112) and the user is enabled to review and make changes to the content entities. In such examples, the content entities are displayed as bounding boxes overlaid on the input content and content type indicators associated with each bounding box, as described herein. The user is enabled to adjust the sizes and/or positions of the bounding boxes, create new bounding boxes, delete bounding boxes, and to change the content types associated with the content entities. Further, the user is enabled to add new content entities by drawing bounding boxes in the interface and associated content types with those bounding boxes.

At 512, the set of content entities are normalized according to a standard interface schema. In some examples, the normalization includes normalizing the positions of the content entities according to a grid and/or in reference to other content entities. Further, the normalization includes configuring text fonts, text sizes, color schemes, line styles, shape styles, or the like. Additionally, or alternatively, the normalization process is performed by a normalizer component that is specific to the content type of the input content (e.g., an image-based normalizer is used to normalize the content entities of image input content while a digital document-based normalizer is used to normalize the content entities of digital document input content).

After the content entities are normalized according to the standard interface schema, an application template is generated using those normalized content entities at 514. In some examples, the application template includes a GUI including the normalized content entities, stub functions and/or basic functions that are configured to control the application template, and/or data structures such as data tables that store data associated with the application template. The generated application template is configured to enable a user to complete the development of the application template into a usable application.

In some examples, the generation of the application template includes identifying a data table that can reviewed and/or confirmed by the user for use with the application. In such examples, a table data structure is determined based on the set of content entities, wherein the table data structure includes a column associated with a content entity of the set of content entities. A user is prompted to review the table data structure and, based on receiving an approval indication from the prompt to review the determined table data structure, the determined table data structure is included in the generated application template. Additionally, or alternatively, the table data structure is configured as a template of a new data table or as a link to an existing data table in a Dataverse.

Figure 6:
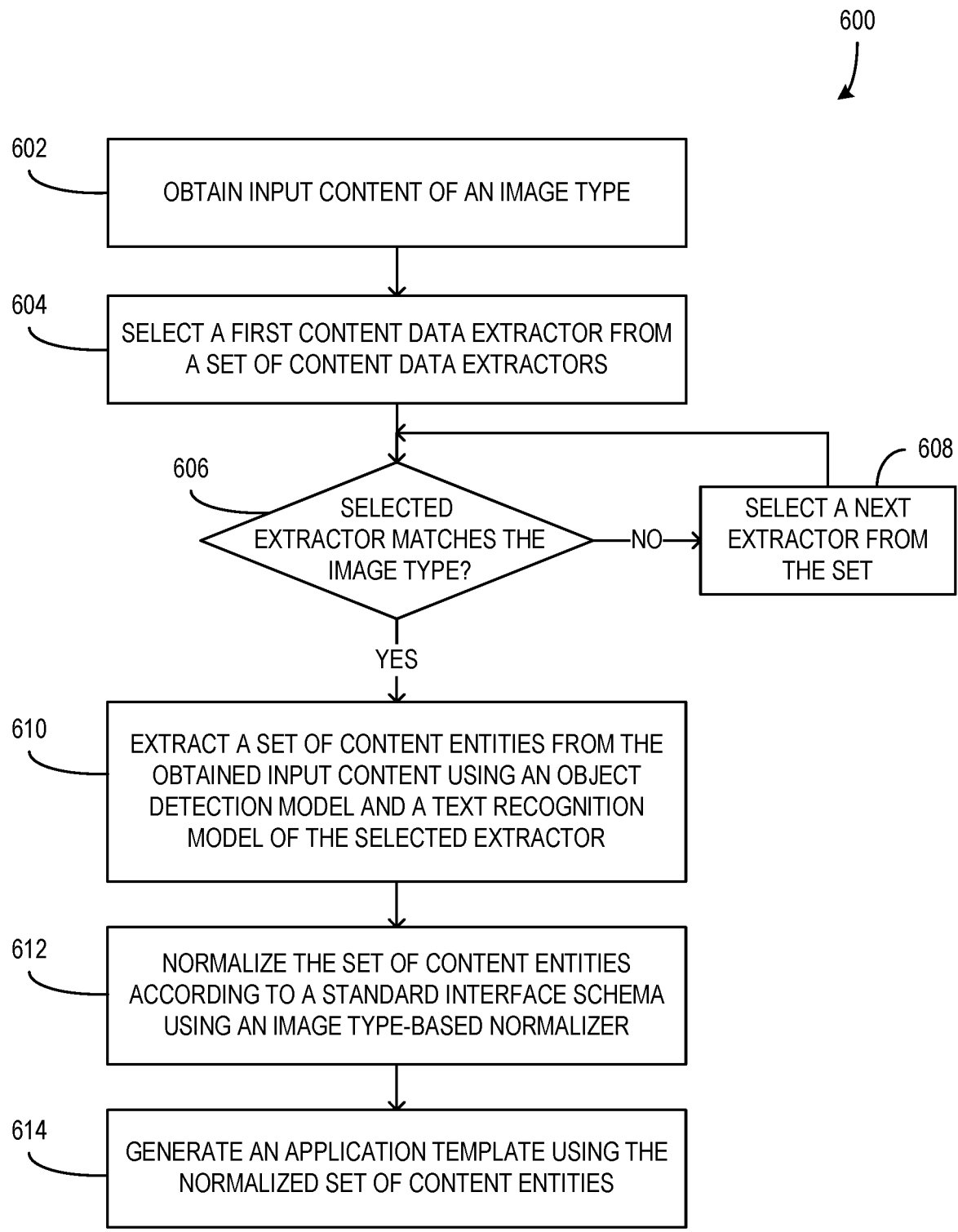
FIG. 6 is a flowchart illustrating a computerized method for generating an application template from input content of an image type.

FIG. 6 is a flowchart illustrating a computerized method 600 for generating an application template (e.g., application template 139) from input content (e.g., input content 106) of an image type. In some examples, the method 600 is executed or otherwise performed in a system such as system 100 of FIG. 1. At 602, input content of an image type is obtained, and an image type-based content data extractor is selected from a set of content data extractors at 604, 606, and 608. In some examples, the selection of the extractor from the set of extractors is performed in substantially the same way as 504, 506, and 508 as described above with respect to FIG. 5, where the content type is an image type.

At 610, a set of content entities is extracted from the obtained input content using an object detection model and a text recognition model of the selected extractor. The object detection model is trained to detect objects, shapes, or the like in the image while the text recognition model is trained to detect words, numbers, letters or other text in the image. The results from the models are identified as content entities of various types by the models as described herein.

At 612, the set of content entities are normalized according to a standard interface schema using an image type-based normalizer. The image type-based normalizer is configured to adjust the size and positions of content entities, as well as adjusting fonts of text to be consistent. Particularly, the image type-based normalizer is configured to make adjustments to the content entities that are commonly necessary to convert an image into the standard interface schema.

At 614, an application template is generated using the normalized set of content entities. In some examples, the generation of the application template is performed in substantially the same way as described above with respect to 514 of FIG. 5.

Figure 7:
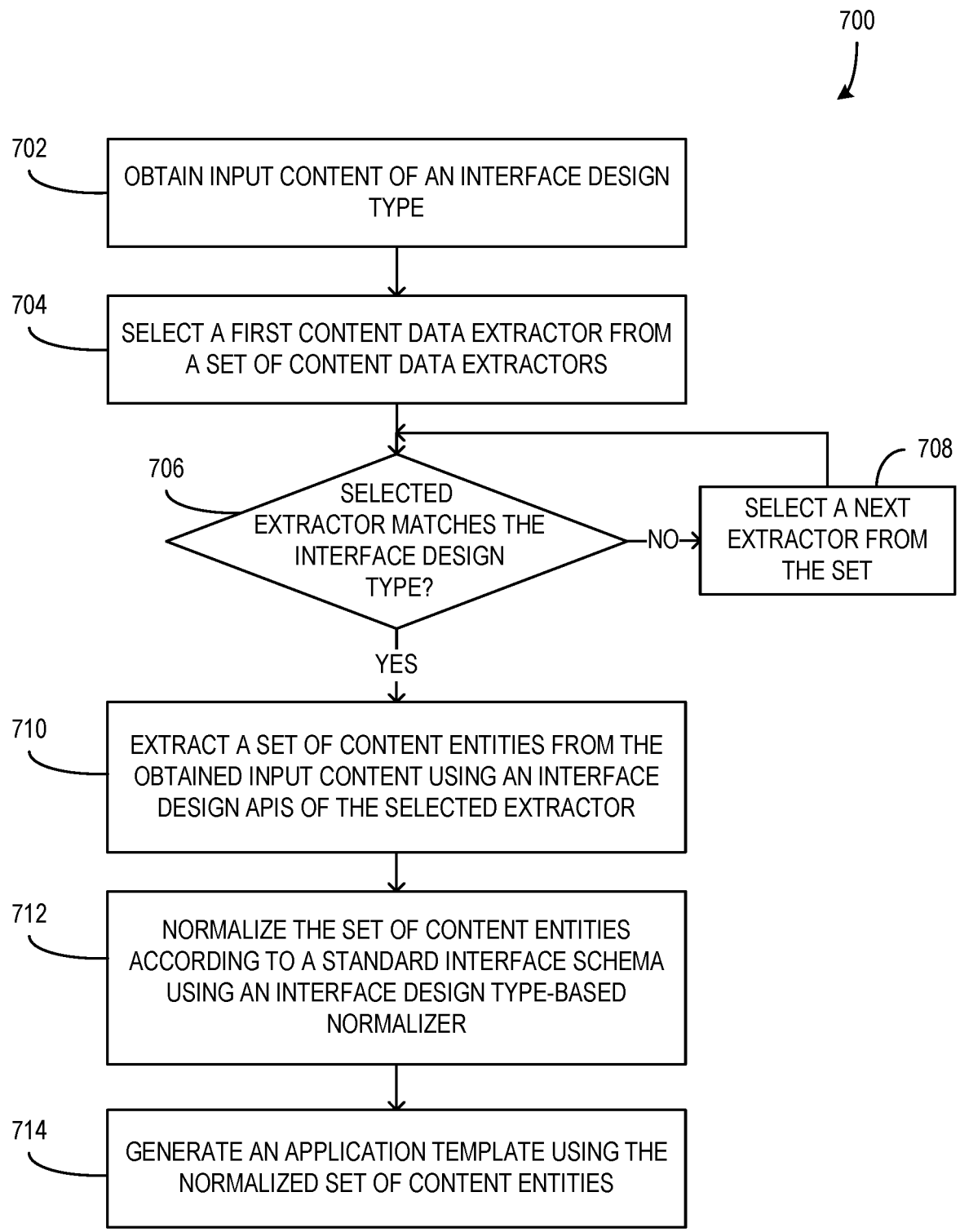
FIG. 7 is a flowchart illustrating a computerized method for generating an application template from input content of an interface design type.

FIG. 7 is a flowchart illustrating a computerized method 700 for generating an application template (e.g., application template 139) from input content (e.g., input content 106) of an interface design type. In some examples, the method 700 is executed or otherwise performed in a system such as system 100 of FIG. 1. At 702, input content of an interface design type is obtained, and an interface design type-based content data extractor is selected from a set of content data extractors at 704, 706, and 708. In some examples, the selection of the extractor from the set of extractors is performed in substantially the same way as 504, 506, and 508 as described above with respect to FIG. 5, where the content type is an interface design type.

At 710, a set of content entities is extracted from the obtained input content using interface design APIs of the selected extractor. In some examples, the APIs are designed and offered by the entity that has created the specific interface design type file that has been obtained as input content. For instance, for a FIGMA file, the available FIGMA APIs are used to extract content entities from the file. The results from APIs are identified as content entities of various types as described herein.

At 712, the set of content entities are normalized according to a standard interface schema using an interface design type-based normalizer. The interface design type-based normalizer is configured to adjust the size and positions of content entities, as well as adjusting fonts or styles of text to be consistent. Particularly, the interface design type-based normalizer is configured to make adjustments to the content entities that are commonly necessary to convert a file of the particular interface design type into the standard interface schema. For instance, with interface design input, position adjustment of content entities may be less common than for image input and an interface design type-based normalizer is configured to normalize styles and formats of the existing content entities.

At 714, an application template is generated using the normalized set of content entities. In some examples, the generation of the application template is performed in substantially the same way as described above with respect to 514 of FIG. 5.

Exemplary Operating Environment

Figure 8:
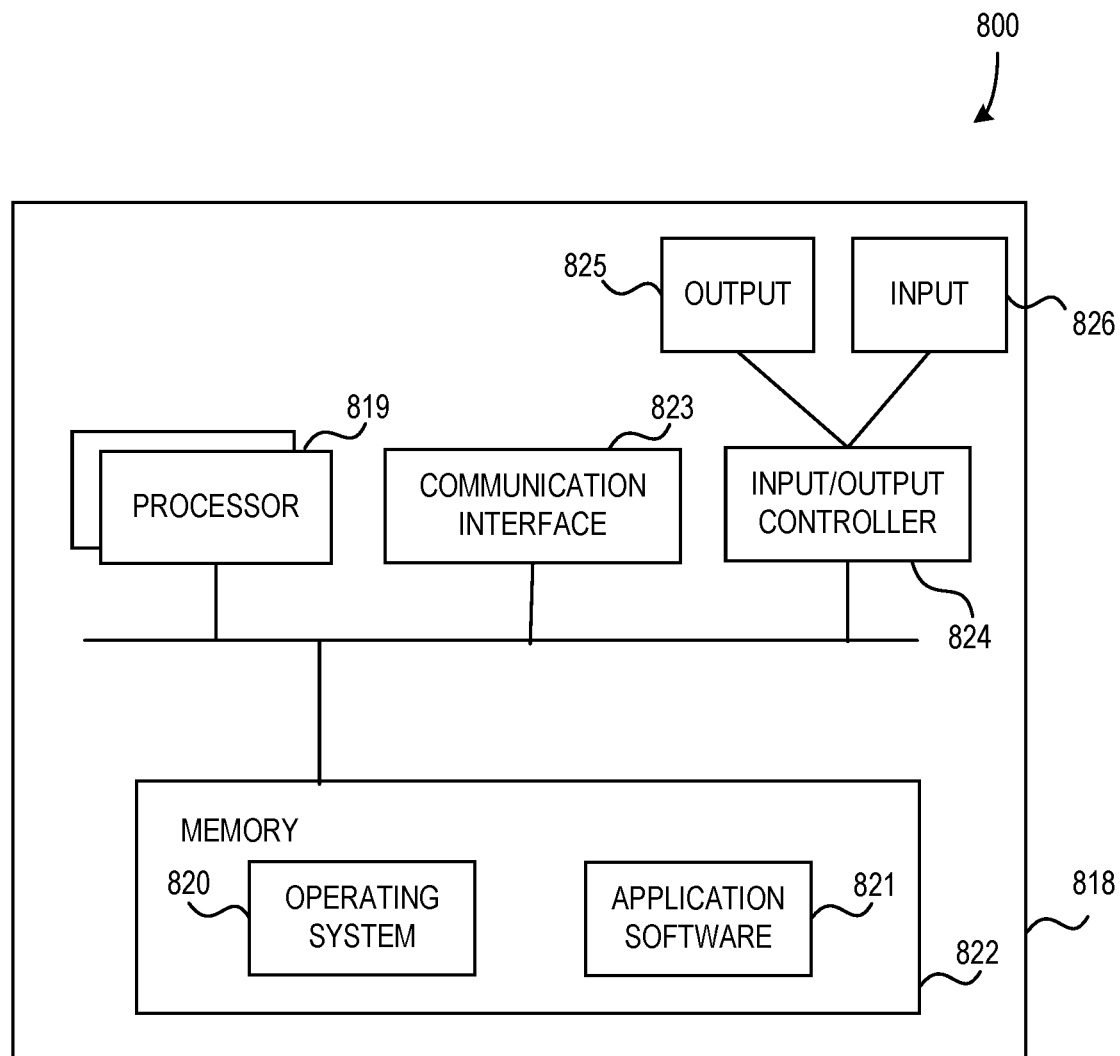
FIG. 8 illustrates an example computing apparatus as a functional block diagram.

The present disclosure is operable with a computing apparatus according to an embodiment as a functional block diagram 800 in FIG. 8. In an example, components of a computing apparatus 818 are implemented as a part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hard-coded machine. In some examples, platform software comprising an operating system 820 or any other suitable platform software is provided on the apparatus 818 to enable application software 821 to be executed on the device. In some examples, generating an application template from input content of a content type as described herein is accomplished by software, hardware, and/or firmware.

In some examples, computer executable instructions are provided using any computer-readable media that are accessible by the computing apparatus 818. Computer-readable media include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that, in some examples, the storage is distributed or located remotely and accessed via a network or other communication link (e.g., using a communication interface 823).

Further, in some examples, the computing apparatus 818 comprises an input/output controller 824 configured to output information to one or more output devices 825, for example a display or a speaker, which are separate from or integral to the electronic device. Additionally, or alternatively, the input/output controller 824 is configured to receive and process an input from one or more input devices 826, for example, a keyboard, a microphone, or a touchpad. In one example, the output device 825 also acts as the input device. An example of such a device is a touch sensitive display. The input/output controller 824 may also output data to devices other than the output device, e.g., a locally connected printing device. In some examples, a user provides input to the input device(s) 826 and/or receive output from the output device(s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An exemplary system comprises at least one processor; and at least one memory comprising computer program code, the at least one memory and the computer program code configured to, with the at least one processor, cause the at least one processor to: obtain input content of a content type; select a content data extractor from a set of content data extractors based on the content type; extract a set of content entities from the obtained input content using the selected content data extractor; normalize the set of content entities according to a standard interface schema; and generate an application template using the normalized set of content entities, whereby an application can be developed using the generated application template.

An example computerized method for generating an application template from input content comprises: obtaining, by a processor, input content of a content type; selecting, by the processor, a content data extractor from a set of content data extractors based on the content type; extracting, by the processor, a set of content entities from the obtained input content using the selected content data extractor; normalizing, by the processor, the set of content entities according to a standard interface schema; and generating, by the processor, an application template using the normalized set of content entities, whereby an application can be developed using the generated application template.

One or more computer storage media having computer-executable instructions for generating an application template from input content that, upon execution by a processor, cause the processor to at least: obtain input content of a content type; select a content data extractor from a set of content data extractors based on the content type; extract a set of content entities from the obtained input content using the selected content data extractor; normalize the set of content entities according to a standard interface schema; and generate an application template using the normalized set of content entities, whereby an application can be developed using the generated application template.

Alternatively, or in addition to the other examples described herein, examples include any combination of the following:

- wherein the input content is of an image type; wherein the selected content data extractor is an image type-specific extractor including an object detection model and a text recognition model; and wherein extracting the set of content entities includes identifying objects in the input content using the object detection model and identifying text in the input content using the text recognition model.
- further comprising: providing the extracted set of content entities to a content editor interface, wherein the content editor interface enables the extracted set of content entities to be adjusted by a user; prompting a user to review the extracted set of content entities using the content editor interface; obtaining an adjusted set of content entities from the content editor interface; and wherein normalizing the set of content entities according to the standard interface schema includes normalizing the adjusted set of content entities according to the standard interface schema.
- wherein the input content is of at least one of the following content types: an image type, a digital document type, an interface design type, and a presentation design type.
- wherein normalizing the set of content entities according to a standard interface schema includes at least one of the following: adjusting a position of a content entity based on a grid, adjusting a size of a content entity, defining a font of text of a content entity, defining a color of a content entity, and defining a shape of a content entity.
- further comprising: determining a table data structure based on the set of content entities, wherein the table data structure includes a column associated with a content entity of the set of content entities; prompting a user to review the determined table data structure; and based on receiving an approval indication from the prompt to review the determined table data structure, including the determined table data structure in the generated application template.
- wherein the set of content entities includes at least one of the following: a text label, a text box, a button, a check box, a menu, and a scrollbar.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining, by a processor, input content of a content type; exemplary means for selecting, by the processor, a content data extractor from a set of content data extractors based on the content type; exemplary means for extracting, by the processor, a set of content entities from the obtained input content using the selected content data extractor; exemplary means for normalizing, by the processor, the set of content entities according to a standard interface schema; and exemplary means for generating, by the processor, an application template using the normalized set of content entities, whereby an application can be developed using the generated application template.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method for generating an application template from input content, the computerized method comprising:
    obtaining, by a processor, the input content of a content type;
    determining the content type of the input content based on a file extension of a file of the input content;
    selecting, by the processor, a content data extractor from a set of content data extractors based on the determined content type;
    extracting, by the processor, a set of content entities from the obtained input content using the selected content data extractor;
    presenting a set of bounding boxes along with the set of content entities, wherein each bounding box of the set of bounding boxes is overlaid on each content entity of the set of content entities, and wherein each bounding box is accompanied by a content type indicator for each content entity;
    selecting a type-specific normalizer based on the content type;
    normalizing, by the processor, the set of content entities using the type-specific normalizer according to a standard interface schema, wherein positions of the set of bounding boxes are adjusted to be consistently spaced from each other or to group subsets of the set of content entities together, and wherein the type-specific normalizer is configured to perform a type-specific normalization process based on the content type; and
    generating, by the processor, the application template using the normalized set of content entities, wherein an application can be developed using the generated application template.

2. The computerized method of claim 1, wherein the user is enabled to create a new bounding box and/or delete one or more bounding boxes from the set of bounding boxes.

3. The computerized method of claim 1, further comprising:
    displaying a set of design ideas to the user, wherein a design idea is a set of appearance-based settings, and wherein the design idea comprises a set of component shapes and line styles;
    prompting the user to select a first design idea from the set of design ideas;
    generating a preview by applying the first design idea to the application template; and
    displaying the preview to the user.

4. The computerized method of claim 1, wherein normalizing the set of content entities using the type-specific normalizer according to the standard interface schema includes aligning the set of content entities on a grid of horizontal lines and vertical lines by adjusting a position of each content entity in the set of content entities based on the grid.

5. The computerized method of claim 1, further comprising:
    determining a table data structure based on the set of content entities, wherein the table data structure includes a column associated with a content entity of the set of content entities;
    prompting the user to review the determined table data structure; and
    based on receiving an approval indication from the prompt to review the determined table data structure, including the determined table data structure in the generated application template.

6. The computerized method of claim 1, wherein the set of content entities includes at least one of the following: a text label, a text box, a button, a check box, a menu, and a scrollbar.

7. A computer storage medium having computer-executable instructions for generating an application template from input content that, upon execution by a processor, cause the processor to:
    obtain the input content of a content type;
    determine the content type of the input content based on a file extension of a file of the input content;
    select a content data extractor from a set of content data extractors based on the determined content type;
    extract a set of content entities from the obtained input content using the selected content data extractor;
    present a set of bounding boxes along with the set of content entities, wherein each bounding box of the set of bounding boxes is overlaid on each content entity of the set of content entities, and wherein each bounding box is accompanied by a content type indicator for each content entity;
    select a type-specific normalizer based on the content type;
    normalize the set of content entities using the type-specific normalizer according to a standard interface schema, wherein positions of the set of bounding boxes are adjusted to be consistently spaced from each other or to group subsets of the set of content entities together, and wherein the type-specific normalizer is configured to perform a type-specific normalization process based on the content type; and
    generate the application template using the normalized set of content entities, wherein an application can be developed using the generated application template.

8. The computer storage medium of claim 7, wherein the user is enabled to create a new bounding box and/or delete one or more bounding boxes from the set of bounding boxes.

9. The computer storage medium of claim 7, wherein the computer-executable instructions, upon execution by the processor, further cause the processor to:
    display a set of design ideas to the user, wherein a design idea is a set of appearance-based settings, and wherein the design idea comprises a set of component shapes and line styles;
    prompt the user to select a first design idea from the set of design ideas;
    generate a preview by applying the first design idea to the application template; and
    display the preview to the user.

10. The computer storage medium of claim 7, wherein normalizing the set of content entities using the type-specific normalizer according to the standard interface schema includes adjusting a position of each content entity in the set of content entities based on a grid of horizontal lines and vertical lines, adjusting a size of a content entity, defining a font of text of the content entity, defining a color of the content entity, and defining a shape of the content entity.

11. The computer storage medium of claim 7, wherein the computer-executable instructions, upon execution by the processor, further cause the processor to:
    determine a table data structure based on the set of content entities, wherein the table data structure includes a column associated with a content entity of the set of content entities; and
    prompt the user to review the determined table data structure; and based on receiving an approval indication from the prompt to review the determined table data structure, include the determined table data structure in the generated application template.

12. A system comprising:
a processor; and
a memory comprising computer program code, the memory and the computer program code configured to, with the processor, cause the processor to:
obtain input content of a content type;
determine the content type of the input content based on a file extension of a file of the input content;
select a content data extractor from a set of content data extractors based on the determined content type;
extract a set of content entities from the obtained input content using the selected content data extractor;
present a set of bounding boxes along with the set of content entities, wherein each bounding box of the set of bounding boxes is overlaid on each content entity of the set of content entities, and wherein each bounding box is accompanied by a content type indicator for each content entity;
select a type-specific normalizer based on the content type;
normalize the set of content entities using the type-specific normalizer according to a standard interface schema, wherein positions of the set of bounding boxes are adjusted to be consistently spaced from each other or to group subsets of the set of content entities together, and wherein the type-specific normalizer is configured to perform a type-specific normalization process based on the content type; and
generate an application template using the normalized set of content entities, wherein an application can be developed using the generated application template.

13. The system of claim 12, wherein the user is enabled to create a new bounding box and/or delete one or more bounding boxes from the set of bounding boxes.

14. The system of claim 12, wherein the memory and the computer program code is configured to, with the processor, further cause the processor to:
display a set of design ideas to the user, wherein a design idea is a set of appearance-based settings, and wherein the design idea comprises a set of component shapes and line styles;
prompt the user to select a first design idea from the set of design ideas;
generate a preview by applying the first design idea to the application template; and
display the preview to the user.

15. The system of claim 12, wherein normalizing the set of content entities using the type-specific normalizer according to the standard interface schema includes aligning the set of content entities on a grid of horizontal lines and vertical lines by adjusting a position of each content entity in the set of content entities based on the grid.

16. The system of claim 12, wherein the memory and the computer program code is configured to, with the processor, further cause the processor to:
determine a table data structure based on the set of content entities, wherein the table data structure includes a column associated with a content entity of the set of content entities; and
prompt the user to review the determined table data structure; and
based on receiving an approval indication from the prompt to review the determined table data structure, include the determined table data structure in the generated application template.

17. The system of claim 12, wherein the set of content entities includes at least one of the following: a text label, a text box, a button, a check box, a menu, and a scrollbar.

* * * * *